United States Patent
Hou et al.

(10) Patent No.: US 12,328,637 B2
(45) Date of Patent: Jun. 10, 2025

(54) METHOD FOR DETERMINING THAT TERMINAL DEVICE IS LOCATED INSIDE GEOFENCE AND TERMINAL DEVICE

(71) Applicant: Huawei Technologies Co., Ltd., Shenzhen (CN)

(72) Inventors: Weibo Hou, Xi'an (CN); Zicheng Yang, Shenzhen (CN); Gelin Ren, Xi'an (CN); Haimou Shi, Xi'an (CN); Xiang Min, Xi'an (CN); Shuai Wang, Xi'an (CN); Zhenguo Zhou, Shezhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 767 days.

(21) Appl. No.: 17/442,945

(22) PCT Filed: Mar. 25, 2019

(86) PCT No.: PCT/CN2019/079590
§ 371 (c)(1),
(2) Date: Sep. 24, 2021

(87) PCT Pub. No.: WO2020/191598
PCT Pub. Date: Oct. 1, 2020

(65) Prior Publication Data
US 2022/0191641 A1    Jun. 16, 2022

(51) Int. Cl.
*H04W 4/02* (2018.01)
*G01S 5/02* (2010.01)
*G01S 19/51* (2010.01)
*H04W 4/021* (2018.01)
*H04W 4/029* (2018.01)

(52) U.S. Cl.
CPC .......... *H04W 4/021* (2013.01); *G01S 5/0236* (2013.01); *G01S 19/51* (2013.01); *H04W 4/029* (2018.02)

(58) Field of Classification Search
CPC ...... H04W 4/021; H04W 4/029; Y02D 30/70; G01S 19/51; G01S 5/0236
See application file for complete search history.

(56) References Cited

U.S. PATENT DOCUMENTS

| | | |
|---|---|---|
| 2011/0286437 A1 | 11/2011 | Austin et al. |
| 2014/0266883 A1 | 9/2014 | Lacatus et al. |

(Continued)

FOREIGN PATENT DOCUMENTS

| | | |
|---|---|---|
| CN | 104101343 A | 10/2014 |
| CN | 106255062 A | 12/2016 |

(Continued)

*Primary Examiner* — Lester G Kincaid
*Assistant Examiner* — Dung L Lam
(74) *Attorney, Agent, or Firm* — Conley Rose, P.C.

(57) ABSTRACT

A method for determining that a terminal device is located inside a geofence includes obtaining, based on a positioning library, a first geographical location corresponding to communication access information of the terminal device. If a location relationship between the first geographical location and the geofence meets a first preset condition, starting a positioning module to obtain a second geographical location of the terminal device and determining, based on the second geographical location, that the terminal device is located inside the geofence.

20 Claims, 17 Drawing Sheets

(56) References Cited

U.S. PATENT DOCUMENTS

| | | | |
|---|---|---|---|
| 2014/0302879 A1* | 10/2014 | Kim | G01S 19/34 |
| | | | 455/457 |
| 2015/0319790 A1 | 11/2015 | Haro et al. | |
| 2016/0066146 A1 | 3/2016 | Jernigan | |
| 2017/0359685 A1 | 12/2017 | Lu et al. | |
| 2018/0192241 A1 | 7/2018 | Jernigan | |

FOREIGN PATENT DOCUMENTS

| | | | |
|---|---|---|---|
| CN | 106485522 A | | 3/2017 |
| CN | 107592615 A | * | 1/2018 |
| WO | 2016095120 A1 | | 6/2016 |

* cited by examiner

| Cell positioning library ||
|---|---|
| Cell ID | Geographical location |
| ID 1 | $(vlon_1, vlat_1)$ |
| ID 2 | $(vlon_2, vlat_2)$ |

| Wi-Fi access point positioning library | |
|---|---|
| Wi-Fi identifier | Geographical location |
| TDIP | $(vlon_1, vlat_1)$ |
| HW-1 | $(vlon_2, vlat_2)$ |

| Wi-Fi access point positioning library | |
|---|---|
| Wi-Fi identifiers set | Geographical location |
| (bssid 1, bssid 2, bssid 3) | $(vlon_1, vlat_1)$ |
| (HW-1, WH-1) | $(vlon_2, vlat_2)$ |

METHOD FOR DETERMINING THAT TERMINAL DEVICE IS LOCATED INSIDE GEOFENCE AND TERMINAL DEVICE

CROSS-REFERENCE TO RELATED APPLICATIONS

This is a National Stage of International Patent Application No. PCT/CN2019/079590 filed on Mar. 25, 2019, which is hereby incorporated by reference in its entirety.

TECHNICAL FIELD

This application relates to the field of terminal technologies, and in particular, to a method for determining that a terminal device is located inside a geofence and a terminal device.

BACKGROUND

With the development of communications technology, various functions of a terminal device are gradually improved. Currently, the terminal device has become an important tool of a user for obtaining information. For example, the terminal device has a function of pushing a service based on a geographical location. A main technology used by the terminal device to implement the function of pushing a service based on a geographical location is a geofence (geofence, GF) awareness technology. The geofence awareness technology means that the terminal device may detect whether the terminal device enters or moves out of a geofence. When detecting that the terminal device enters the geofence, the terminal device may provide a corresponding service, for example, pushing merchant information in the geofence.

Currently, a commonly used geofence awareness technology is a global positioning system (global positioning system, GPS), but GPS positioning causes relatively large power consumption.

SUMMARY

Embodiments of this application provide a method for determining that a terminal device is located inside a geofence and a terminal device. In the method, a related service can be pushed based on a geographical location. This further reduces power consumption.

According to a first aspect, an embodiment of this application provides a method for determining that a terminal device is located inside a geofence. The method may be performed by the terminal device. The terminal device stores a positioning library, and the positioning library includes communication access information and corresponding geographical location information. The method includes: obtaining, based on the positioning library, a first geographical location corresponding to the communication access information of the terminal device; if a location relationship between the first geographical location and the geofence meets a first preset condition, starting a positioning module to obtain a second geographical location of the terminal device; and determining, based on the second geographical location, that the terminal device is located inside the geofence.

It should be understood that the terminal device does not need to keep starting the positioning module, but may determine the first geographical location based on the positioning library and the communication access information of the terminal device. When the first geographical location meets a condition, the terminal device starts the positioning module to obtain the second geographical location, and then determines, based on the second geographical location, that a mobile phone is located inside the geofence. This helps reduce power consumption.

In a possible design, the first preset condition includes: a closest distance between the first geographical location and the geofence is less than or equal to a first preset threshold.

It should be understood that the terminal device does not need to keep starting the positioning module. When detecting that the terminal device is close to the geofence, the terminal device starts the positioning module. This helps reduce power consumption.

In a possible design, the first preset condition further includes: the first geographical location is outside the geofence.

It should be understood that the terminal device does not need to keep starting the positioning module. When detecting that the terminal device is outside the geofence and is close to the geofence, the terminal device starts the positioning module. This helps reduce power consumption.

In a possible design, the communication access information includes cell access information.

In a possible design, the communication access information includes Wi-Fi access information.

It should be understood that the cell access information and the Wi-Fi access information are merely examples, but do not constitute a limitation.

In a possible design, the positioning module includes a GPS module.

It should be understood that the GPS module is merely an example and does not constitute a limitation.

In a possible design, the starting a positioning module to obtain a second geographical location of the terminal device includes: starting the positioning module to obtain the second geographical location of the terminal device based on a trigger periodicity. The method further includes: if the terminal device is in a motion state, setting the trigger periodicity based on a closest distance between the second geographical location and the geofence and a moving speed of the terminal device.

It should be understood that the positioning module does not need to be always enabled, but may be periodically enabled. A periodicity may be set. For example, when the terminal device is in the motion state, the periodicity is set based on a closest distance between a current geographical location and the geofence and the moving speed of the terminal device.

In a possible design, the starting a positioning module to obtain a second geographical location of the terminal device includes: starting the positioning module to obtain the second geographical location of the terminal device based on the trigger periodicity. The method further includes: if the terminal device is in a static state, increasing the trigger periodicity.

It should be understood that the positioning module does not need to be always enabled, but may be periodically enabled. A periodicity may be set. For example, when the terminal device is in the static state, the periodicity is increased.

In a possible design, the obtaining, based on the positioning library, a first geographical location corresponding to the communication access information of the terminal device includes: if a first geographical location corresponding to first communication access information of the terminal device fails to be obtained based on the positioning library, obtaining, based on the positioning library, a first geographical location corresponding to second communication access information of the terminal device.

It should be understood that the positioning library may include the first communication access information and the second communication access information. When the terminal device cannot implement positioning based on the first communication access information, the terminal device may implement positioning based on the second communication access information.

In a possible design, the first communication access information is cell access information, and the second communication access information is Wi-Fi access information.

It should be understood that, when the terminal device fails to perform positioning based on the cell access information, the terminal device may perform positioning based on the Wi-Fi access information.

In a possible design, if the closest distance between the second geographical location and the geofence is greater than a second preset threshold, disabling the positioning module.

It should be understood that, to reduce power consumption, when the closest distance between the current geographical location of the terminal device and the geofence is relatively far, the positioning module may be disabled. The second preset threshold may be equal to the first preset threshold.

In a possible design, before obtaining, based on the positioning library, the first geographical location corresponding to the communication access information of the terminal device, the terminal device further reports location reference information to a server, where the location reference information is used to indicate an area range in which the terminal device is currently located; and receives the positioning library sent by the server. The positioning library corresponds to the area range.

It should be understood that the terminal device may download the positioning library from the server. The positioning library now corresponds to the area range in which the terminal device is currently located. In this way, the terminal device does not need to keep enabling the positioning module during positioning, and the positioning library may be used for positioning. This helps reduce power consumption.

In a possible design, the terminal device may further output first information of a first service. The first service is related to an event of entering the geofence.

It should be understood that, when determining that the terminal device is located inside the geofence, the terminal device may output a service related to the geofence, for example, information about a point of interest (a shop, an attraction, or the like) of the geofence.

In a possible design, if the second geographical location indicates that the terminal device moves out of the geofence, the terminal device may further output second information of a second service. The second service is related to an event of moving out of the geofence.

It should be understood that, when determining to move out of the geofence, the terminal device may output a service related to moving out of the geofence. For example, when determining to move out of an attraction area, a service such as a home route, a point of interest (a shop, another attraction, or the like) outside the attraction area, or a reminder to a user to modify a subscription service (for example, changing a SIM card subscription package) may be output.

In a possible design, the terminal device establishes communication with another terminal device; and sends the positioning library to the another terminal device when determining that the another terminal device meets a condition.

It should be understood that positioning libraries may be shared between different terminal devices, and before sharing, it may be determined whether a peer device meets a condition, to avoid privacy leakage.

In a possible design, the determining that the another terminal device meets a condition includes: determining that a distance between the another terminal device and the terminal device is less than a preset distance; or receiving an instruction that is sent by the another terminal device and that is used to request the positioning library.

It should be understood that when two terminal devices are relatively close, positioning library sharing may be implemented, or one terminal device may request sharing of the positioning library from another terminal device.

According to a second aspect, an embodiment of this application further provides a positioning library creation method. The method may be performed by a server, and the method includes; The server receives communication access information and first geographical location information that are reported by at least one terminal device. The server constructs a positioning library. The positioning library includes a correspondence between communication access information and a second geographical location. The second geographical location is determined based on a first geographical location. The server delivers the positioning library to the at least one terminal device.

It should be understood that the server may construct the positioning library by collecting a communication access point and a geographical location that are reported by the terminal device, and then deliver the positioning library to the terminal device. In this way, the terminal device may implement positioning by using the positioning library, without keeping starting a positioning module.

In a possible design, before the server delivers the positioning library to the at least one terminal device, the server receives location reference information sent by the at least one terminal device. The location reference information is used to indicate an area range in which the at least one terminal device is currently located. The server determines the positioning library corresponding to the area range.

It should be understood that the server may deliver a proper positioning library to the terminal device based on the area range in which the terminal device is currently located.

According to a third aspect, an embodiment of this application provides a method for determining that a terminal device is located inside a geofence. The method is applied to the terminal device. The terminal device includes a coprocessor, an application processor, a modem processor, a positioning module, and an output device. The coprocessor is separately connected to the positioning module, the application processor, and the modem processor, and the application processor is connected to the output device. The terminal device stores at least one geofence and at least one cell within a preset distance range outside each geofence. The method includes: The coprocessor determines, by using the modem, that the terminal device camps on a first cell. The coprocessor determines that the first cell is a cell within a preset distance range outside a first geofence. The coprocessor triggers to start the positioning module, and obtains current geographical location information of the terminal device by using the positioning module. If the coprocessor determines, based on the current geographical location information, that the terminal device enters the first geofence, the coprocessor triggers to start the application processor. The application processor determines a service based on the first geofence, and the application processor outputs information about the service through the output device.

It should be understood that the terminal device may not need to keep starting the positioning module. When determining, based on a current camped cell, that the terminal device is close to the geofence, the terminal device starts the positioning module. This helps reduce power consumption.

In a possible design, that the coprocessor determines that the first cell is a cell within a preset distance range outside a first geofence includes: the coprocessor determines that a cell ID of the first cell exists in cell IDs of all cells within the preset distance range outside the first geofence.

It should be understood that, when determining whether the terminal device is close to the geofence, the terminal device may search all cell IDs within the preset distance range outside the geofence for a cell ID of a camped cell. If the cell ID of the camped cell exists, the terminal device is close to the geofence, and in this case, the positioning module is started. This helps reduce power consumption.

In a possible design, the terminal device stores a cell positioning library, the cell positioning library includes at least one cell and geographical location information corresponding to each cell. Before the coprocessor triggers to start the positioning module, the coprocessor further determines, in the cell positioning library, a first geographical location corresponding to the first cell. The coprocessor determines a closest distance between the first geographical location and the first geofence. That the coprocessor triggers to start the positioning module includes: when the closest distance is less than a preset distance, triggering to start the positioning module.

In a possible design, the positioning module is a Wi-Fi module, and the obtaining current geographical location information of the terminal device by using the positioning module includes: searching for at least one AP by using the Wi-Fi module, to obtain a first set including a Wi-Fi identifier of the at least one AP. The determining, based on the current geographical location information, that the terminal device enters the first geofence includes: The coprocessor determines that the first set is equal to the second set; or the coprocessor determines that an intersection set of the first set and the second set is not empty; or the coprocessor determines that a quantity of same Wi-Fi identifiers in the first set and the second set is greater than a preset quantity. The second set is a set including Wi-Fi identifiers of all APs in the first geofence.

According to a fourth aspect, an embodiment of this application further provides a terminal device, including a display, one or more processors, a memory, one or more applications, and one or more programs. The one or more programs are stored in the memory. The one or more programs include instructions. When the instructions are executed by the terminal device, the terminal device is enabled to perform the method according to any one of the first aspect or the possible designs of the first aspect. Alternatively, when the instructions are executed by the electronic device, the terminal device is enabled to perform the method according to any one of the third aspect or the possible designs of the third aspect.

According to a fifth aspect, an embodiment of this application further provides a server, a memory, a processor, and a transceiver. The processor is coupled to the memory and the transceiver. The memory is configured to store computer-executable program code. The program code includes instructions, and when the processor executes the instructions, the instructions enable the server to perform the technical solution according to any one of the second aspect or the possible design of the second aspect.

According to a sixth aspect, an embodiment of this application further provides a terminal device. The terminal device includes modules/units that perform the method according to any one of the first aspect or the possible designs of the first aspect, or the electronic device includes modules/units that perform the method according to any one of the third aspect or the possible designs of the third aspect. These modules/units may be implemented by hardware, or may be implemented by hardware executing corresponding software.

According to a seventh aspect, an embodiment of this application further provides a server. The server includes modules/units that perform the method according to any one of the second aspect or the possible design of the second aspect. These modules/units may be implemented by hardware, or may be implemented by hardware executing corresponding software.

According to an eighth aspect, an embodiment of this application further provides a computer-readable storage medium. The computer-readable storage medium includes a program, and when the program is run on a terminal device, the terminal device is enabled to perform the method according to any one of the first aspect or the possible designs of the first aspect; or when the program is run on a terminal device, the terminal device is enabled to perform the method according to any one of the third aspect or the possible designs of the third aspect; or when the program is run on a server, the server is enabled to perform the method according to any one of the second aspect or the possible design of the second aspect.

According to a ninth aspect, a program product is further provided. When the program product runs on a terminal device, the terminal device is enabled to perform the method according to any one of the first aspect or the possible designs of the first aspect; or when the program product runs on a terminal device, the terminal device is enabled to perform the method according to any one of the third aspect or the possible designs of the third aspect; or when the program product runs on a server, the server is enabled to perform the method according to any one of the second aspect or the possible design of the second aspect.

According to a tenth aspect, a chip system is further provided. The chip system includes a processor, may further include a memory, and is configured to implement the method according to the first aspect, the second aspect, or the third aspect, or the method according to any possible designs of the first aspect, the second aspect, or the third aspect. The chip system may include a chip, or may include a chip and another discrete component.

DESCRIPTION OF EMBODIMENTS

The following describes the technical solutions in embodiments of this application with reference to the accompanying drawings in the embodiments of this application.

In the following, some terms of the embodiments of this application are described, so as to help persons skilled in the art have a better understanding.

Figures 1, 2:
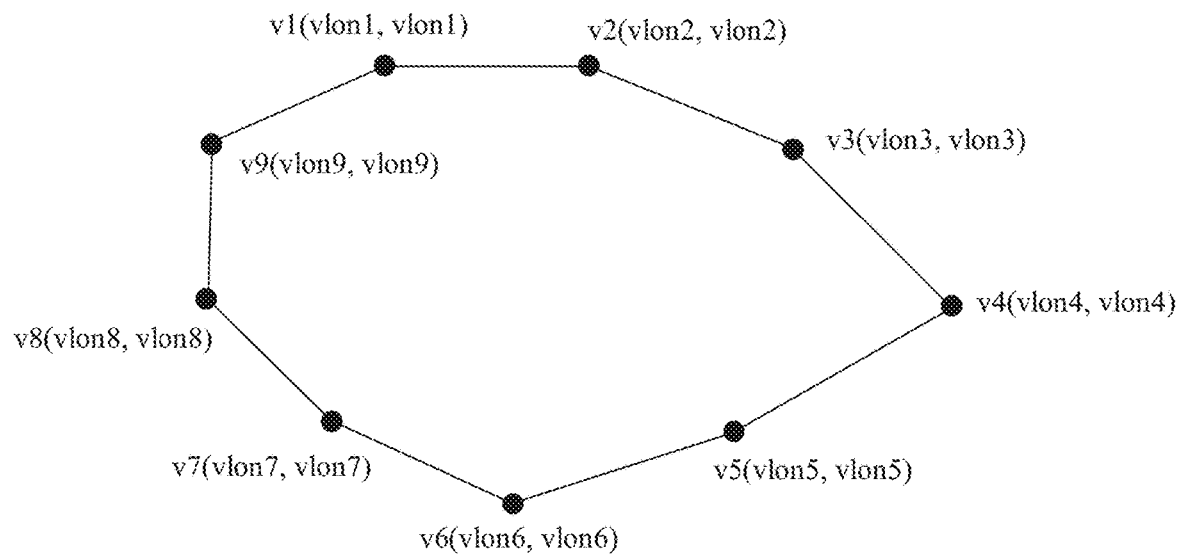
FIG. 1 is a schematic diagram of a geofence according to an embodiment of this application.
FIG. 2 is a schematic diagram of a cell positioning library according to an embodiment of this application.

The geofence in the embodiments of this application is an area enclosed by a plurality of geographical locations. FIG. 1 is a schematic diagram of a geofence according to an embodiment of this application. As shown in FIG. 1, the geofence is an area enclosed by straight lines formed by connecting a plurality of vertices, and each vertex includes a longitude and a latitude. A longitude of an $i^{th}$ vertex is represented by $vlon_i$, and a latitude is represented by $vlat_i$. Therefore, the geofence shown in FIG. 1 can be represented by $GF=[vlon_1, vlat_1, vlon_2, vlat_2 \ldots von_n, vlat_n]$. When a terminal device detects that a longitude and latitude at a location is $(vlon_m, vlat_m)$, the terminal device determines whether the longitude and latitude is within a range of the GF, and if the longitude and latitude is within the range of the GF, the terminal device enters the geofence.

It should be noted that in FIG. 1, an example in which two vertices on the geofence are connected through a straight line is used. In actual application, the two vertices may alternatively be connected through a curve. For example, the terminal device may perform curve connection according to a preset rule. The preset rule may include a radian of a curve between two adjacent vertices, or the like. This is not limited in this embodiment of this application. For example, the terminal device may determine, based on the preset rule during the curve connection, whether the terminal device is within the range of the GF.

A cell in this embodiment of this application refers to communication access information, and is not a cell in a physical sense, for example, a cell built by a real estate agent, but a wireless coverage area identified by using a base station identity code or global cell identity. In a global system for mobile communications (global system for mobile communications, GSM), a cell (cell) refers to an area covered by a sector antenna of a base transceiver station (base transceiver station, BTS). In wideband code division multiple access (wideband code division multiple access, WCDMA), a cell refers to coverage of a single carrier in a sector. One sector may contain a plurality of carriers and a plurality of cells.

A cell positioning library in this embodiment of this application is a correspondence between cell information and geographical location information of a cell. The cell information may include a cell ID or the like. FIG. 2 is a schematic diagram of a cell positioning library according to an embodiment of this application. As shown in FIG. 2, the cell positioning library includes a correspondence between a cell ID and a geographical location. The geographical location may be location information of a base station corresponding to a cell. For example, a geographical location, that is, a longitude and latitude ($vlon_1$, $vlat_1$), corresponding to a cell ID 1 is location information of a base station corresponding to a cell 1.

It should be understood that the cell positioning library shown in FIG. 2 may be a database structure or the like. This is not limited in this embodiment of this application.

It should be noted that the cell positioning library provided in this embodiment of this application may be preset and stored in a terminal device before the terminal device is delivered from a factory, or may be downloaded from a cloud server to the terminal device in a use process.

The following describes several implementations in which the terminal device downloads the cell positioning library.

In a first implementation, the terminal device may download, from the cloud server, a cell positioning library of a city in which the terminal device is currently located.

For example, the terminal device may request to obtain a cell positioning library of a city from the cloud server. For example, the terminal device may report information about a current city to the cloud server, and the cloud server sends a cell positioning library of the city to the terminal device. When the terminal device is idle (for example, the terminal device currently runs a few applications, or a user does not operate a mobile phone for a long time), the terminal device may download the cell positioning library of the current city from the cloud server. Alternatively, when the terminal device is used for the first time after delivery, the terminal device may download the cell positioning library of the current city from the cloud server.

For another example, the cloud server may also actively send a cell positioning library of a city to the terminal device. For example, when the cell positioning library is updated, the server actively sends an updated cell positioning library to the terminal device.

Specifically, the server obtains the cell positioning library in a plurality of manners. For example, the terminal device may periodically report a geographical location and cell information of a camped cell. For the server, after collecting a large quantity of camped cells and geographical locations that are reported by the terminal device, the server may determine, based on the geographical location, a geographical location of a base station corresponding to a cell, then construct a cell positioning library based on the cell and the geographical location of the corresponding base station that are reported by the terminal device, and deliver the constructed cell positioning library to the terminal device.

Figures 3, 4:
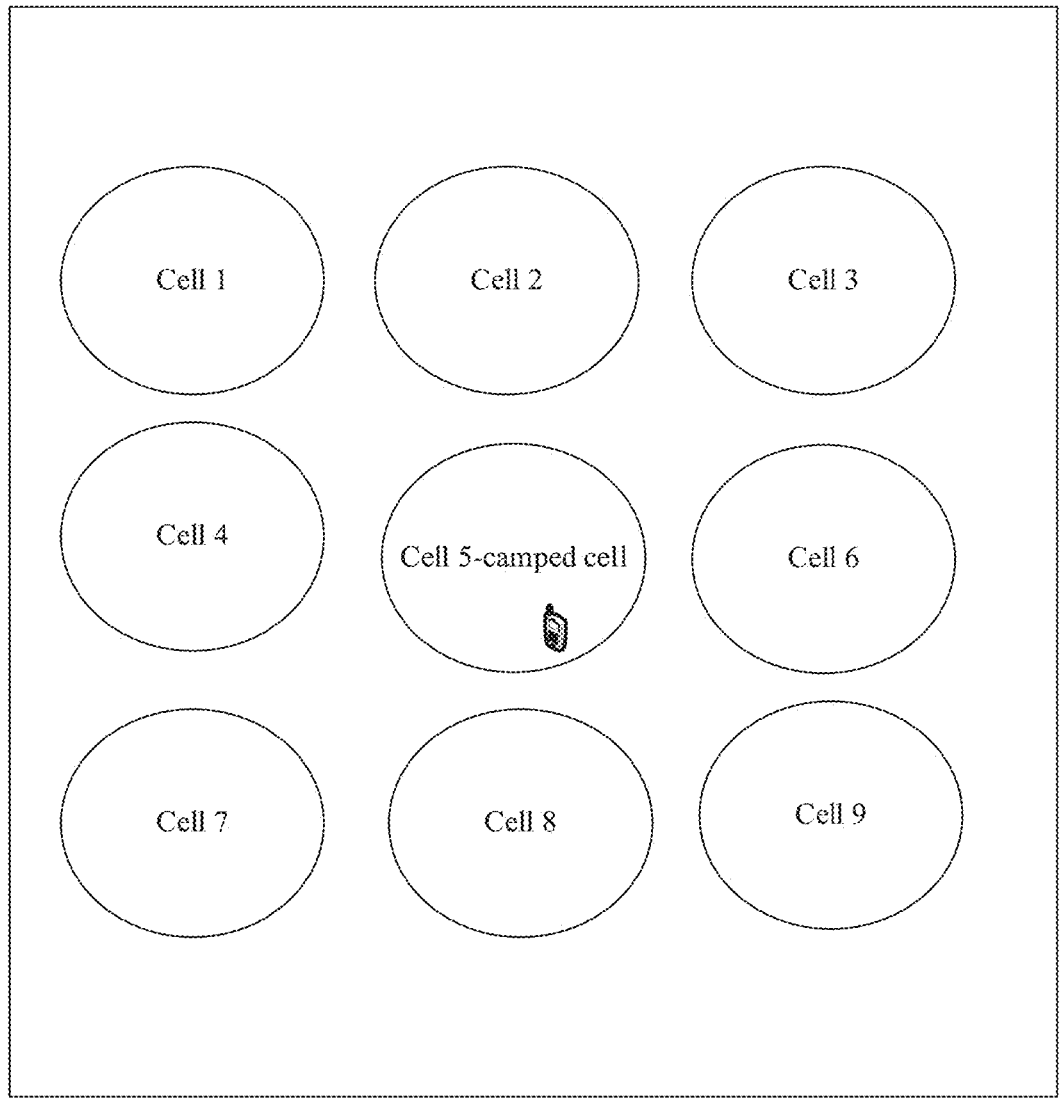
FIG. 3 is a schematic diagram of a plurality of cells according to an embodiment of this application.
FIG. 4 is a schematic diagram of a Wi-Fi access point positioning library according to an embodiment of this application.

In a second implementation, when downloading the cell positioning library, the terminal device may download geographical location information of a plurality of cells (for example, eight cells) around a current camped cell. Referring to FIG. 4, it is assumed that a terminal device currently camps on a cell 5, and the terminal device may download, from a server, geographical location information of eight cells around the cell 5, to obtain a cell positioning library.

Therefore, the cell positioning library can be updated. For example, still referring to FIG. 4, when the terminal device moves from the cell 5 to a cell 6, the terminal device downloads geographical locations of eight cells around the cell 6, but geographical locations of five cells (cells 2, 3, 5, 6, and 9) in the eight cells around the cell 6 do not need to be downloaded again. A use process of the cell positioning library is described in the following.

It should be understood that eight cells around each cell are used as an example in FIG. 4. In actual application, when downloading the cell positioning library, the terminal device may further download more cells around each cell. This is not limited in this embodiment of this application.

In a third implementation, the terminal device may further obtain the cell positioning library from another terminal device.

For example, if a mobile phone 1 establishes a short-distance connection (a Bluetooth connection or a direct Wi-Fi connection) to a mobile phone 2, the mobile phone 1 sends the cell positioning library to the mobile phone 2. For example, after detecting that the short-distance connection to the mobile phone 2 is established, a mobile phone 100 may actively send the cell positioning library to the mobile phone 2, or may send the cell positioning library to the mobile phone 2 when triggered by the user, so as to avoid leakage of user privacy.

In a fourth implementation, the terminal device constructs to obtain the cell positioning library. For example, each time after camping on a cell, the terminal device may record geographical location information, and then construct a correspondence between the cell and the geographical location information, to obtain the cell positioning library.

It should be noted that the terminal device may select, by using a preset policy, one of the foregoing manners to download the cell positioning library. For example, if the terminal device has relatively large data traffic, or when the terminal device accesses a wireless network, the terminal device may download geographical location information of surrounding cells in real time, that is, the second manner is used. For another example, if the terminal device has relatively large memory, the first manner may be used. Certainly, the user may also specify a manner in which the cell positioning library is downloaded. This is not limited in this embodiment of this application.

This embodiment of this application relates to a Wi-Fi access point positioning library, that is, a correspondence between a Wi-Fi access point and a geographical location, and may be specifically a correspondence between identification information of the Wi-Fi access point and the geographical location. FIG. 4 is a schematic diagram of a Wi-Fi access point positioning library. As shown in FIG. 4, when detecting that a Wi-Fi identifier of an accessed Wi-Fi is TDIP, a terminal device may determine, based on a positioning library shown in FIG. 4, that a current geographical location is ($vlon_1$, $vlat_1$).

In the Wi-Fi access point positioning library shown in FIG. 4, a geographical location corresponding to each Wi-Fi identifier may be a geographical location in which a Wi-Fi access point is located.

The terminal device may obtain the Wi-Fi access point positioning library in a plurality of manners.

In a first implementation, the terminal device may download, from a server, a Wi-Fi access point positioning library corresponding to an area range in which the terminal device is currently located. The area range in which the terminal device is currently located may be a cell, a city, or the like in which the terminal device is currently located.

For example, the terminal device may send a request to the server, where the request carries cell information or city information, and the server determines a Wi-Fi node positioning library based on the request, and sends the Wi-Fi node positioning library to the terminal device.

For example, the terminal device may periodically send the request, or send the request when triggered by a user (for example, when a service push function is triggered and enabled). Alternatively, when detecting that information about a currently located city changes, the terminal device reports city information to the server, and then receives a Wi-Fi access point positioning library that is corresponding to the city information and that is sent by the server. Alternatively, when detecting that a camped cell changes, the terminal device reports information about the switched camped cell to the server, and then receives a Wi-Fi positioning library corresponding to the camped cell sent by the server.

In a second implementation, the server may actively send the Wi-Fi access point positioning library to the terminal device. For example, after determining that a Wi-Fi positioning library downloaded by the terminal device last time is updated, the server may actively send an updated Wi-Fi positioning library to the terminal device.

For example, the server may collect Wi-Fi information and geographical locations that are reported by each terminal device, determine location information of a Wi-Fi access point based on the reported geographical location information, then form a Wi-Fi access point positioning library, and deliver the Wi-Fi access point positioning library to the terminal device.

In a third implementation, the Wi-Fi access point positioning library may alternatively be collected by the terminal device. For example, each time the terminal device accesses a Wi-Fi access point, the terminal device may record geographical location information, and then construct a correspondence between the Wi-Fi access point and the geographical location information, to obtain the Wi-Fi access point positioning library.

The Wi-Fi access point (access point, AP) in this embodiment of this application may be a wireless route, a mobile phone hotspot, or the like. This is not limited in this embodiment of this application. Each AP has one Wi-Fi identifier, and the Wi-Fi identifier may be a basic service set identifier (basic service set identifier, bssid) or a Wi-Fi name. The bssid may include a MAC address of the AP, and the Wi-Fi name may be a name of the AP set by the user.

An application (application, app for short) in this embodiment of this application is a software program that can implement one or more specific functions. Generally, a plurality of applications can be installed on the terminal device, for example, a camera application, an SMS message application, an MMS message application, various email applications, WeChat (WeChat), Tencent chat software (QQ), WhatsApp Messenger, Line (Line), Instagram (Instagram), Kakao Talk, DingTalk. The application mentioned in the following may be an application installed when the terminal device is delivered from a factory, or may be an application downloaded by the user from a network or obtained by the user from another terminal device in a process of using the terminal device.

In this embodiment of this application, some applications provide related services based on a geographical location. These applications may be an application specified by the user, for example, an application that is set by the user to enable a positioning function, for example, a map application or a Meituan application. Alternatively, these applications may be fixed applications that are set when the terminal device is delivered from a factory. This is not limited in this embodiment of this application.

"A plurality of" in the embodiments of this application indicates "two or more".

It should be noted that, the term "and/or" in this specification describes only an association relationship between associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects. In the descriptions of the embodiments of this application, terms such as "first" and "second" are only used for distinction and description, but cannot be understood as indication or implication of relative importance, and cannot be understood as an indication or implication of a sequence.

The following describes the terminal device, a graphical user interface (graphical user interface, GUI) used for the terminal device, and embodiments for using the terminal device. In some embodiments of this application, the terminal device may be a portable terminal device, such as a mobile phone, a tablet computer, or a wearable device (for example, a smartwatch) having a wireless communication function. The portable terminal device includes a component (for example, a GPS positioning module or a Wi-Fi module) that can detect a geographical location, and has a function of providing a corresponding service based on the geographical location. An example embodiment of the portable terminal device includes but is not limited to a portable terminal device using iOS®, Android®, Microsoft®, or another operating system. The portable terminal device may alternatively be another portable terminal device provided that the portable terminal device can detect a geographical location and provide a corresponding service based on the geographical location. It should be further understood that, in some other embodiments of this application, the terminal device may be not the portable terminal device, but a desktop computer that can detect a geographical location and provide a corresponding service based on the geographical location.

Certainly, in some other embodiments of this application, the terminal device may not need to have a capability of providing a corresponding service based on a geographical location. For example, the terminal device may send the detected geographical location to the cloud server. The cloud server determines, based on the geographical location sent by the terminal device, whether the terminal device enters a geofence, and if the terminal device enters the geofence, determines a corresponding service, and sends related information about the service to the terminal device. The terminal device pushes the related information about the service to the user. In the following, an example in which the terminal device detects a geographical location and provides a corresponding service based on the geographical location is used.

Figure 5:
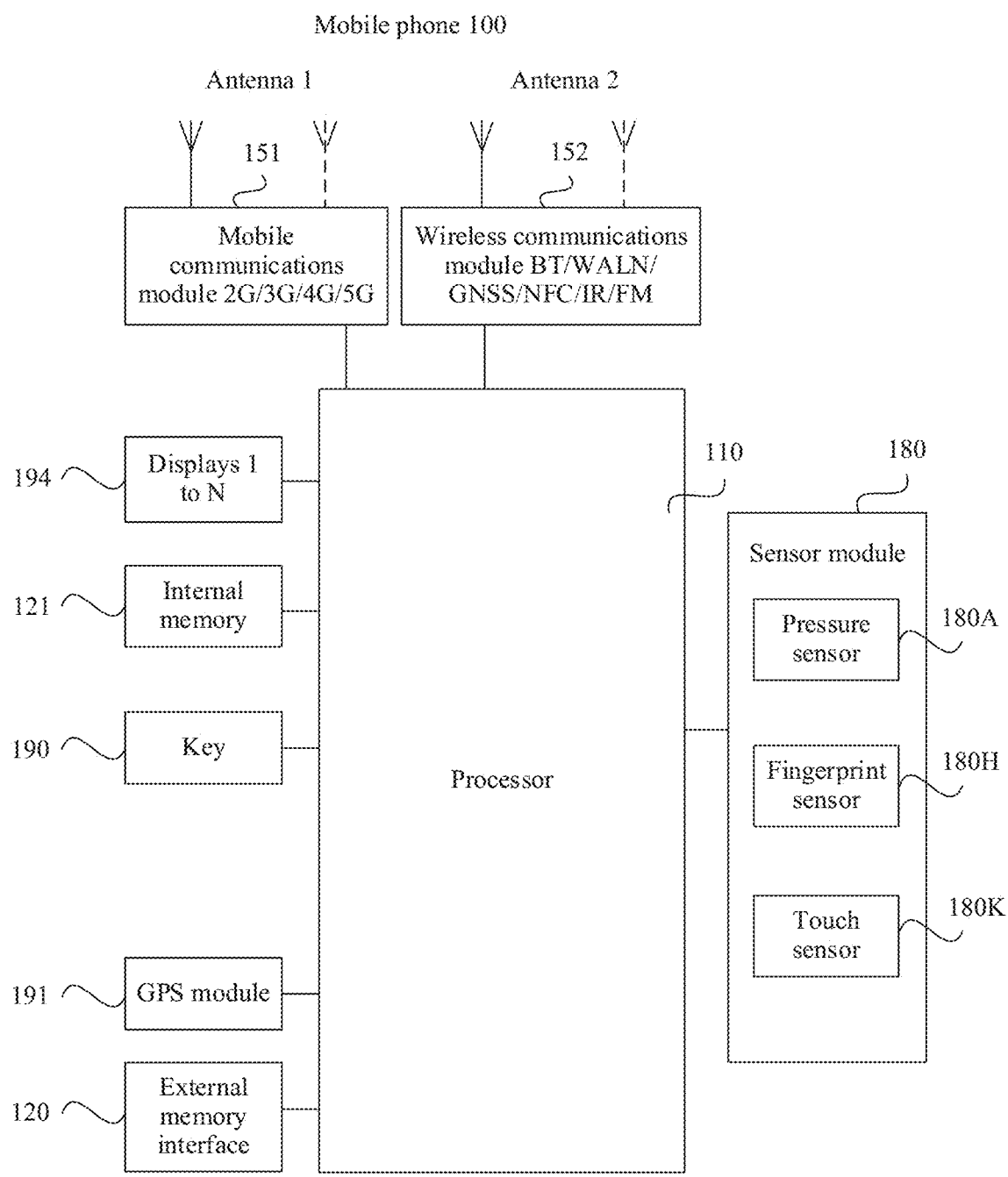
FIG. 5 is a schematic structural diagram of a mobile phone 100 according to an embodiment of this application.

For example, the terminal device is a mobile phone. FIG. 5 is a schematic structural diagram of a mobile phone 100.

The mobile phone 100 may include a processor 110, an external memory interface 120, an internal memory 121, an antenna 1, an antenna 2, a mobile communications module 151, a wireless communications module 152, a sensor module 180, a key 190, a display 194, a GPS module 191, and the like. The sensor module 180 may include a pressure sensor 180A, a fingerprint sensor 180H, a touch sensor 180K, and the like (the mobile phone 100 may further include another sensor, such as a temperature sensor, an ambient light sensor, and a gyroscope sensor, which is not shown in the figure).

It may be understood that a structure shown in this embodiment of this application does not constitute a specific limitation on the mobile phone 100. In some other embodiments of this application, the mobile phone 100 may include more or fewer components than those shown in the figure, combine some components, split some components, or have different component arrangements. The components shown in the figure may be implemented by using hardware, software, or a combination of software and hardware.

The following describes the components in the mobile phone 100 shown in FIG. 5.

The processor 110 may include one or more processing units. For example, the processor 110 may include an application processor (application processor, AP), a modem processor (modem), a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the mobile phone 100. The controller may generate an operation control signal based on instruction operation code and a time sequence signal, to complete control of instruction reading and instruction execution.

The memory may be further disposed in the processor 110, and is configured to store instructions and data. In some embodiments, the memory in the processor 110 is a cache. The memory may store instructions or data that are/is used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

The processor 110 can run software code of a method for determining that a terminal device is located inside a geofence provided in this embodiment of this application, to implement a service push function.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application required by at least one function, and the like. The data storage area may store data (for example, a photo and a video) created during use of the mobile phone 100, and the like.

The internal memory 121 may be further configured to store the software code of the method for determining that the terminal device is located inside the geofence provided in this embodiment of this application. When the processor 110 accesses and runs the software code, a geographical location-based service push function is implemented. The internal memory 121 may further store three types of geofence shown in FIG. 1, a cell positioning library, such as the cell positioning library shown in FIG. 2, and the Wi-Fi positioning library shown in FIG. 4. Specific content is described in the following.

The internal memory 121 may include a high-speed random access memory, and may further include a nonvolatile memory, for example, at least one magnetic disk storage device, a flash memory or a universal flash storage (universal flash storage, UFS).

The following describes functions of the sensor module 180.

The pressure sensor 180A is configured to sense a pressure signal, and may convert the pressure signal into an electrical signal. In some embodiments, the pressure sensor 180A may be disposed on the display 194.

The fingerprint sensor 180H is configured to collect a fingerprint. The mobile phone 100 may use a feature of the collected fingerprint to implement fingerprint unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor 180K may transfer the detected touch operation to an application processor, to determine a type of a touch event. Visual output related to the touch operation may be provided through the display 194. In some other embodiments, the touch sensor 180K may alternatively be disposed on a surface of the mobile phone 100 and is at a location different from that of the display 194.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the mobile phone 100 may include one or N displays 194, where N is a positive integer greater than 1.

After the processor 110 runs the software code of the method for determining that the terminal device is located inside the geofence provided in this embodiment of this application, the display 194 may be configured to display related information about a pushed service. Specific content is described in the following.

The wireless communications module 152 may be configured to search for an AP to detect a Wi-Fi identifier. The processor 110 may determine, based on the Wi-Fi identifier, whether the mobile phone 100 enters the geofence. The foregoing content has described a process, and details are not described herein again.

The GPS module 191 may be configured to detect longitude and latitude information of geographical location information in which the mobile phone 100 is currently located. The processor 110 may determine, based on the longitude and latitude information, whether the mobile phone 100 enters the geofence. Specific content is described in the following.

The external memory interface 120 may be configured to connect to an external memory card, for example, a micro SD card, to extend a storage capability of the electronic device 100. The external storage card communicates with the processor 110 through the external memory interface 120, to implement a data storage function. For example, the software code of the method for determining that the terminal device is located inside the geofence provided in this embodiment of this application may be stored in an external memory, and the processor 110 may access and run, through the external memory interface 120, the software code stored in the external memory, to implement the geographical location-based service push function. The cell positioning library, such as the cell positioning library shown in FIG. 2, and the Wi-Fi positioning library shown in FIG. 4, and the geofence shown in FIG. 1 may also be stored in the external memory. The processor 110 may obtain, through the external memory interface 120, the cell positioning library, the geofence, and the like that are stored in the external memory.

A wireless communication function of the mobile phone 100 may be implemented by using the antenna 1, the antenna 2, the mobile communications module 151, the wireless communications module 152, or the like.

The antenna 1 and the antenna 2 are configured to transmit and receive electromagnetic wave signals. Each antenna in the mobile phone 100 may be configured to cover one or more communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 151 can provide a solution, applied to the mobile phone 100, to wireless communication including 2G, 3G, 4G, 5G, and the like. The mobile communications module 151 may include at least one filter, a switch, a power amplifier, a low noise amplifier (low noise amplifier, LNA), and the like. The mobile communications module 151 may receive an electromagnetic wave through the antenna 1, perform processing such as filtering or amplification on the received electromagnetic wave, and transmit a processed electromagnetic wave to the modem processor for demodulation. The mobile communications module 151 may further amplify a signal modulated by the modem processor, and convert the signal into an electromagnetic wave for radiation through the antenna 1. In some embodiments, at least some function modules of the mobile communications module 151 may be disposed in the processor 110. In some embodiments, at least some function modules of the mobile communications module 151 and at least some modules of the processor 110 may be disposed in a same device.

The wireless communications module 152 may provide a solution, applied to the mobile phone 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR) technology, and the like. The wireless communications module 152 may be one or more components integrating at least one communications processing module. The wireless communications module 152 receives an electromagnetic wave through the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation through the antenna 2.

In some embodiments, in the mobile phone 100, the antenna 1 and the mobile communications module 151 are coupled, and the antenna 2 and the wireless communications module 152 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), a satellite based augmentation system (satellite based augmentation system, SBAS), and/or the like.

If the mobile phone 100 does not have a capability of providing a corresponding service based on a geographical location, the mobile phone 100 may send detected geographical location information to a cloud server through the wireless communications module 151 or the mobile communications module 152. The cloud server determines whether the mobile phone 100 enters the geofence, and if the mobile phone 100 enters the geofence, determines a corresponding service, and sends related information about the service to the mobile phone 100.

The mobile phone 100 may receive input of the key 190, and generate key signal input related to a user setting and function control of the mobile phone 100.

Although not shown in FIG. 5, the mobile phone 100 may further include an audio module, a SIM card interface, and a camera. The mobile phone 100 may further include a motor, configured to generate a vibration prompt (for example, an incoming call vibration prompt). The mobile phone 100 may further include an indicator, for example, an indicator light, configured to indicate a charging status, a battery level change, or may be used to indicate information, a missed call, a notification, or the like.

For ease of describing the method for determining that the terminal device is located inside the geofence provided in this embodiment of this application, components related to the method for determining that the terminal device is located inside the geofence are extracted from all components in the mobile phone 100 shown in FIG. 5. The following describes, by using these components, the method for determining that the terminal device is located inside the geofence in this embodiment of this application. For details, refer to FIG. 6. It should be noted that in FIG. 6, an example in which the processor 110 integrates an application processor 110-1, a modem processor 110-2, and a coprocessor 110-3 is used.

The modem processor 110-2 is configured to search for a network for registration, and camp on a proper cell after finding the proper cell. A search and registration process has been described above, and details are not described herein again. Therefore, the modem processor 110-2 can obtain cell information of a current camped cell. In the following example, the cell information is a cell ID.

The coprocessor 110-3 is configured to determine whether the mobile phone 100 enters the geofence. When determining that the mobile phone 100 has entered a geofence range, the coprocessor 110-3 may wake up the application processor 110-1. The application processor 110-1 recommends a related service based on the entering geofence event.

Therefore, in this embodiment of this application, the application processor 110-1 may not need to be always enabled, that is, a task of determining whether the mobile phone 100 enters the geofence is executed by the coprocessor 110-3, and power consumption consumed by the coprocessor 110-3 is less than power consumption consumed by the application processor 110-1. This helps reduce power consumption.

Figure 6:
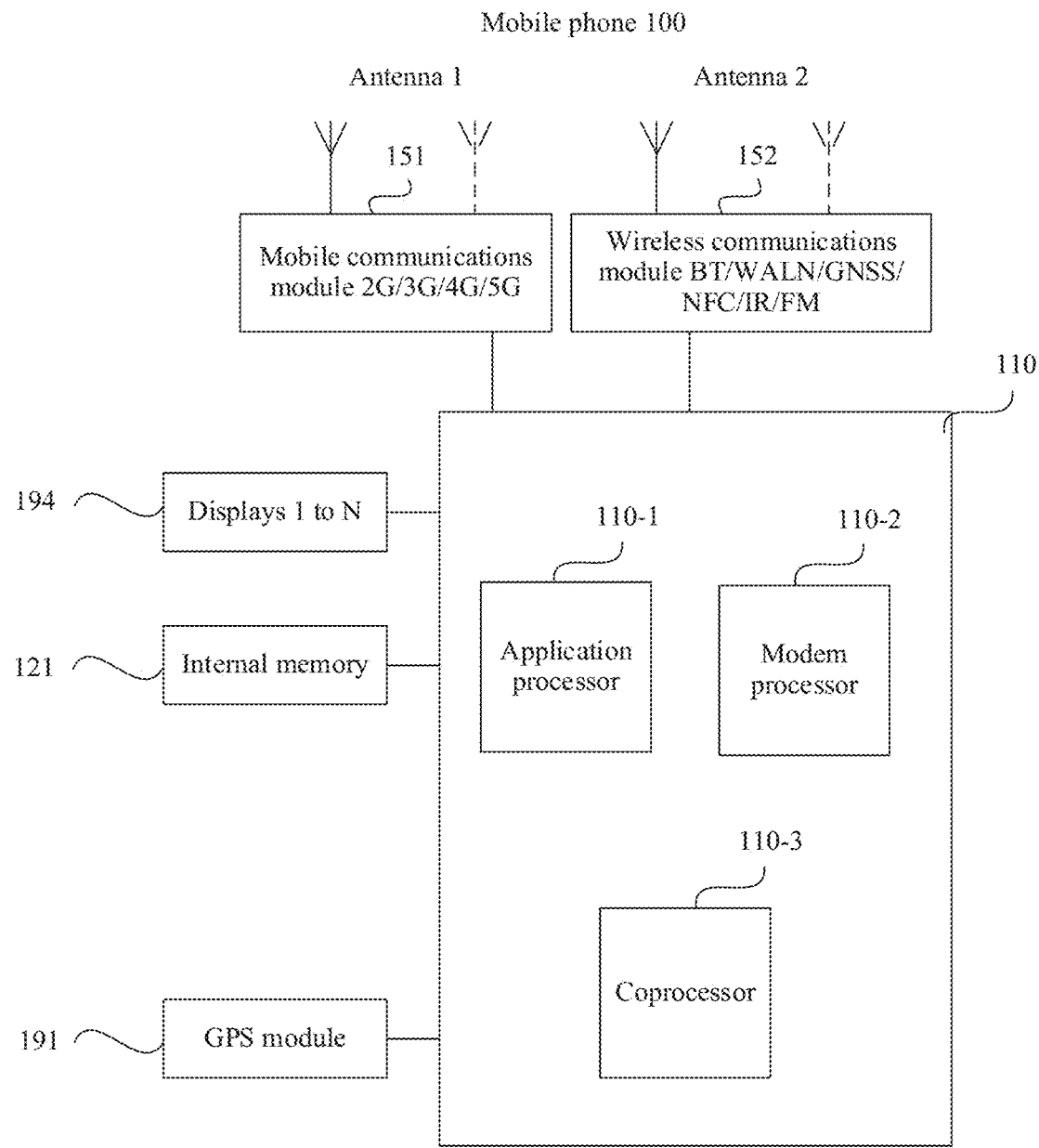
FIG. 6 is a schematic structural diagram of a mobile phone 100 according to an embodiment of this application.

The following describes several possible implementations to determine that the mobile phone 100 shown in FIG. 6 is located inside the geofence.

Manner 1:

Using FIG. 2 as an example, the internal memory 121 may store a cell positioning library. After obtaining a cell ID of a current camped cell, the modem processor 110-2 may send the cell ID to the coprocessor 110-3. The coprocessor 110-3 may match geographical location information corresponding to the cell ID in the stored cell positioning library. Assuming that the cell ID of the current camped cell obtained by the modem processor 110-2 is an ID 1, it may be determined, based on the cell positioning library shown in FIG. 2, that a geographical location corresponding to the ID 1 is (vlon$_1$, vlat$_1$).

Therefore, in the first manner, the coprocessor 110-3 may determine, in the cell positioning library based on the cell ID detected by the modem processor 110-2, geographical location information (that is, a longitude and latitude of the current camped cell) corresponding to the cell ID. After learning the longitude and latitude, the coprocessor 110-1 compares the longitude and latitude with the geofence, such as the geofence shown in FIG. 2, and determines whether the mobile phone 100 enters the geofence range (a specific process has been described above, and details are not described herein again). When determining that the mobile phone 100 enters the geofence, the coprocessor 110-3 triggers and wakes up the application processor 110-1. The application processor 110-1 pushes a service based on the current geofence.

In the first manner, because the cell positioning library may be downloaded in advance, the mobile phone 100 may obtain current geographical location information without enabling a GPS module, and the application processor does not need to be always enabled. The coprocessor wakes up the application processor only when determining that the mobile phone 100 enters the geofence. This helps reduce power consumption.

Manner 2:

Using the Wi-Fi access point positioning library shown in FIG. 4 as an example, the mobile phone 100 stores a correspondence between a Wi-Fi identifier and a geographical location (for example, a longitude and latitude). The correspondence may be obtained by downloading from a server, or may be collected by the mobile phone 100.

When determining that a Wi-Fi identifier of currently accessed Wi-Fi is a first identifier, the coprocessor 110 may determine, in the correspondence, a first geographical location corresponding to the first identifier. After determining the first geographical location, the coprocessor 110 may determine, based on the first geographical location, whether the mobile phone 100 enters the geofence.

Therefore, in the second manner, the mobile phone 100 can determine whether to enter the geofence without starting the GPS module, and the application processor does not need to be always enabled. The coprocessor wakes up the application processor only after determining that the mobile phone 100 has entered the geofence. This helps reduce power consumption.

Manner 3:

FIG. 1 is used as an example. The internal memory 121 stores the geofence shown in FIG. 1. The coprocessor 110-3 may be communicatively connected to the GPS module 191. When the GPS module 191 is in an enabled state, the GPS module 191 may detect current geographical location information such as longitude and latitude information, and then send the information to the coprocessor 110-3. The coprocessor 110-3 may determine, based on the current longitude and latitude information, whether the mobile phone 100 enters the geofence. When determining that the mobile phone 100 enters the geofence, the coprocessor 110-3 triggers and wakes up the application processor 110-1. The application processor 110-1 pushes a service based on the current geofence.

In the third manner, the mobile phone 100 implements positioning by using the GPS module. Because positioning precision of a GPS positioning technology is relatively high, accuracy is relatively high in the fifth implementation.

In actual application, the mobile phone 100 may combine and use at least two of the foregoing three manners. The following uses an example for description.

Example 1

Manner 1 (cell positioning library) and manner 3 (GPS positioning) are combined.

Figure 7A:
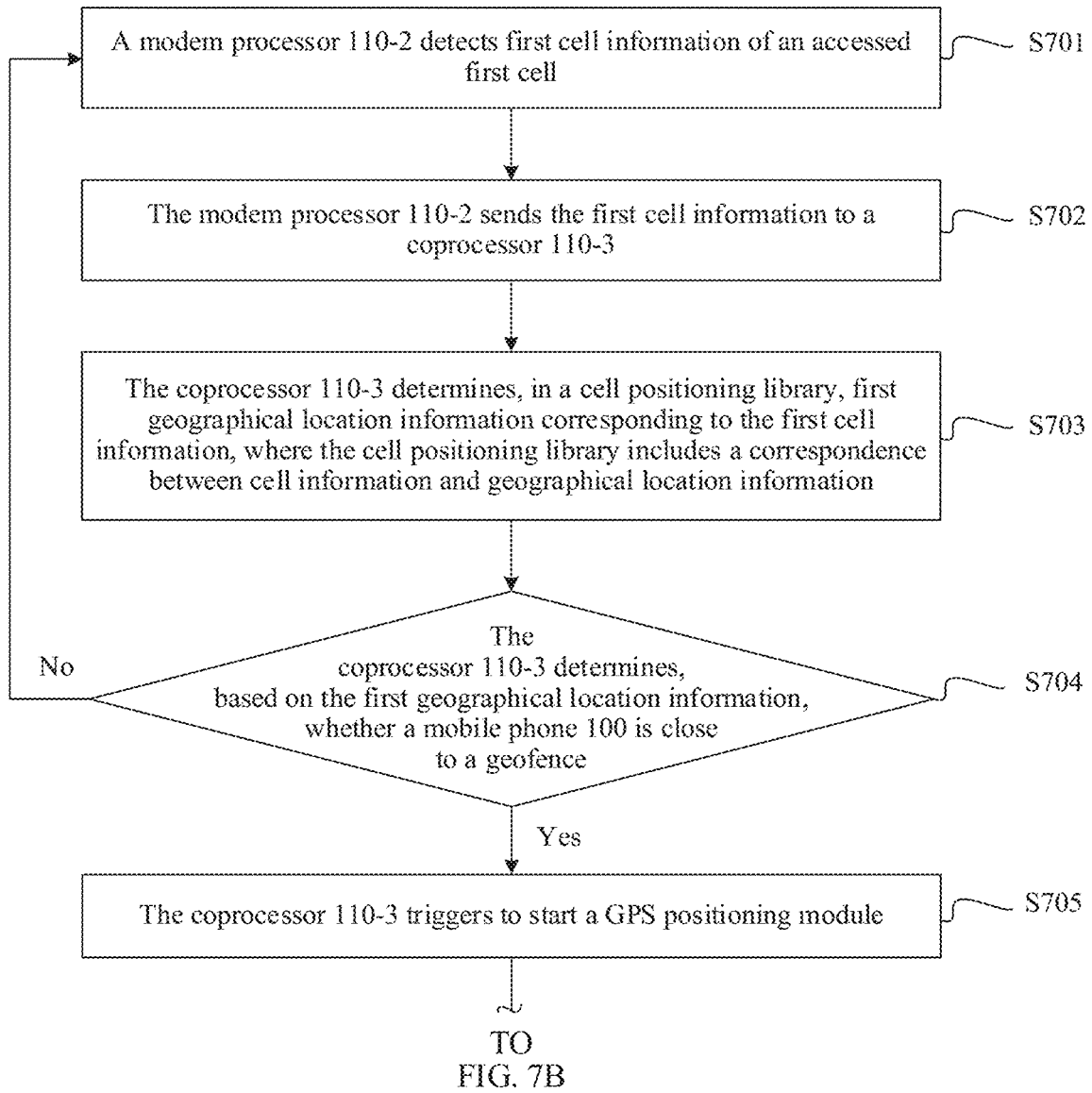
FIG. 7A and FIG. 7B are a schematic flowchart of a method for determining that a terminal device is located inside a geofence according to an embodiment of this application.
Figure 7B:
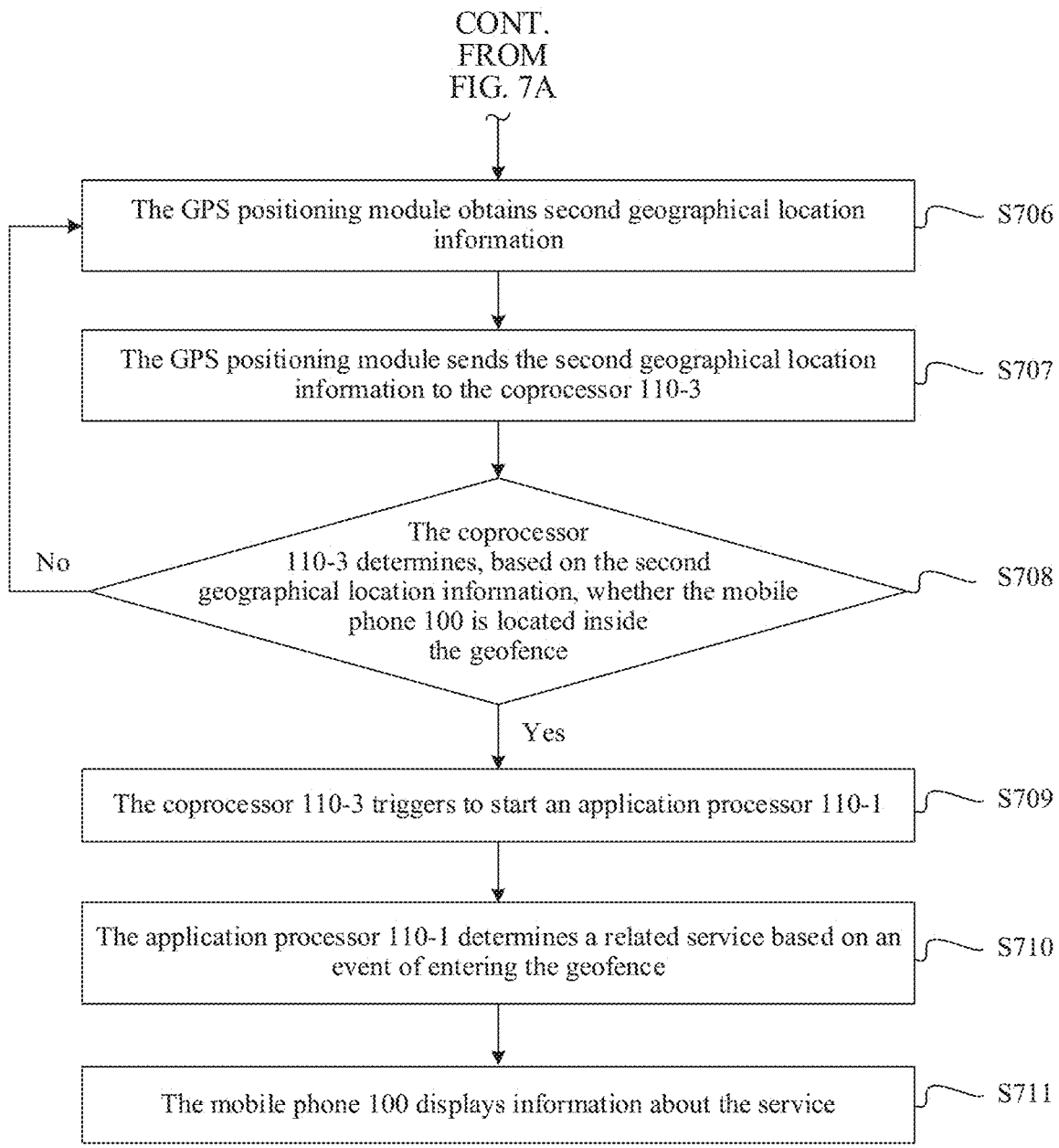

FIG. 7A and FIG. 7B are a flowchart of a method for determining that a terminal device is located inside a geofence according to an embodiment of this application. As shown in FIG. 7A and FIG. 7B, a procedure of the method includes the following steps.

S701: The modem processor 110-2 detects first cell information of an accessed first cell.

S702: The modem processor 110-2 sends the first cell information to the coprocessor 110-3.

S703: The coprocessor 110-3 determines, in a cell positioning library, first geographical location information corresponding to the first cell information, where the cell positioning library includes a correspondence between cell information and geographical location information.

S704: The coprocessor 110-3 determines, based on the first geographical location information, whether the mobile phone 100 is close to the geofence. If yes, S705 is performed; or if no, S701 is performed.

For example, the geofence shown in FIG. 1 is used as an example. The coprocessor 110-3 may determine whether the geographical location is outside the geofence, and a distance between the geographical location and a geofence boundary is less than or equal to a first preset threshold. If yes, it indicates that the current location is relatively close to the geofence boundary, and a GPS module can be enabled. If no, it indicates that the current location is relatively far away from the geofence, and the GPS module does not need to be enabled.

S705: The coprocessor 110-3 triggers to start the GPS module.

In the foregoing process, the coprocessor has determined that the mobile phone 100 is close to the geofence. To improve accuracy of a detected geographical location, the coprocessor 110-3 triggers to start the GPS positioning module, and the GPS positioning module detects geographical location information, such as longitude and latitude information.

For example, when detecting the geographical location information, the GPS module may periodically detect the geographical location information. A detection periodicity may be set before delivery, or may be determined by the mobile phone 100.

In an example, the coprocessor 110-3 in the mobile phone 100 may determine the detection periodicity based on a closest distance between current geographical location information and the geofence.

For example, assuming that the closest distance between the current geographical location information and the geofence is represented by K; if K is greater than K0, the coprocessor 110-3 may calculate the detection periodicity (represented by Dur) based on the following formula:

$Dur=K/Vavg$, where

Vavg is a moving speed of the mobile phone 100, and Dur is the detection periodicity.

For another example, if K is less than or equal to K0, the periodicity $Dur=Dur_{fix}$ is set.

A value of K0 and a value of $Dur_{fix}$ may be set before delivery of the mobile phone 100, for example, K0=600 meters, and $Dur_{fix}$=60 seconds.

In another example, the coprocessor 110-3 may further identify whether the mobile phone 100 is in an absolute static state. If the mobile phone 100 is in the absolute static state, the coprocessor 110-1 may set a relatively long detection periodicity.

A manner in which the coprocessor 110-1 determines whether the mobile phone 100 is in the absolute static state may be as follows: The coprocessor 110-1 determines whether sensor data changes after previous positioning, for example, determines whether sensor data detected by an angular velocity transducer or a gyroscope changes. If the sensor data does not change, it indicates that the mobile phone 100 is in the absolute static state. For example, if the mobile phone 100 is kept being placed on a desktop, sensor data detected by the mobile phone 100 does not change, and a relatively long detection periodicity may be set for the mobile phone 100.

In still another example, the coprocessor may identify whether the mobile phone 100 is in a relative static state. If the mobile phone 100 is in the relative static state, the coprocessor 110-1 may set a relatively long detection periodicity.

The relative static state may be understood as that the mobile phone 100 is in the moving state, but a moving range is relatively small, that is, the mobile phone 100 moves within a small range. A manner in which the coprocessor 110-3 determines that the mobile phone 100 is in the relative static state may be as follows: The coprocessor 110-1 determines that the sensor data changes after previous positioning, but a current camped cell of the mobile phone 100 does not change, or a scanned Wi-Fi identifier does not change. It indicates that the mobile phone 100 is in the relative static state.

Figure 8:
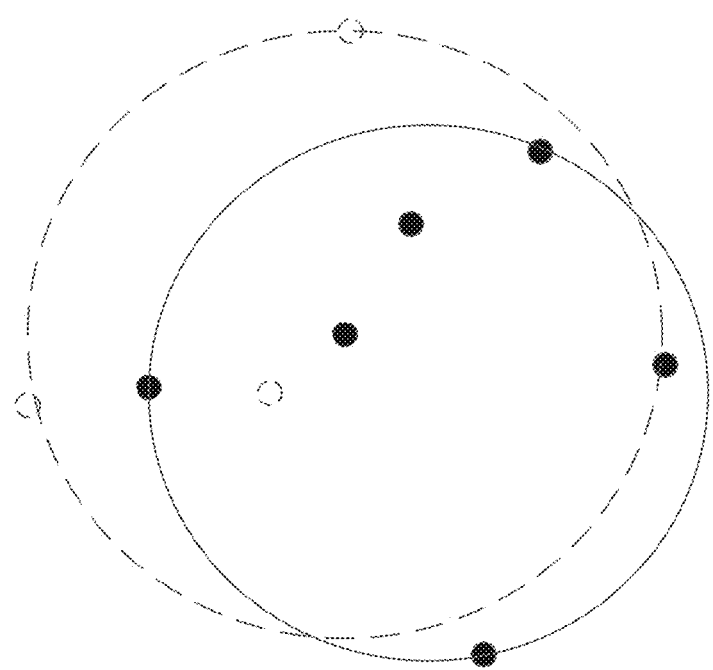
FIG. 8 is a schematic diagram of a minimum envelope circle according to an embodiment of this application.

Another manner in which the coprocessor 110-3 determines whether the mobile phone 100 is in the relative static state may be as follows: The coprocessor 110-3 may cache N pieces of historical location information, and gradually replace the historical location information after obtaining new location information. After a quantity of new replacement locations reaches N/2, a minimum envelope circle of the N pieces of location information is calculated. If a radius of the minimum envelope circle is less than a threshold, it is considered that the device has a relatively small moving range, and is in the relative static state. FIG. 8 is a schematic diagram of the minimum envelope circle according to this embodiment of this application. The minimum envelope circle formed by the N pieces of historical location information is a dashed line in FIG. 8. After half of the N pieces of historical location information is replaced with new location information, the minimum envelope circle formed by the N pieces of location information is a solid line in FIG. 8. If a radius of the solid line is less than a threshold, the mobile phone 100 moves within a small range and is in the relative static state. When the mobile phone 100 is in the relative static state, the coprocessor 110-1 may set a relatively long detection periodicity.

It should be understood that the detection periodicity in the relative static state may be less than the detection periodicity in the absolute static state.

S706: The GPS module obtains a second geographical location.

Similarly, the GPS positioning module may also periodically detect the longitude and latitude information. A manner of determining the detection periodicity has described above, and details are not described herein again.

S707: The GPS module sends the second geographical location to the coprocessor 110-3.

S708: The coprocessor 110-3 determines, based on the second geographical location, whether the mobile phone 100 enters the geofence. If yes, S709 is performed; or if no, S706 is performed.

S709: The coprocessor 110-3 triggers to start the application processor 110-1.

S710: The application processor 110-1 determines a corresponding service based on an event of entering the geofence.

S711: The mobile phone 100 displays related information about the service.

In this embodiment of this application, to reduce power consumption, the GPS module may be disabled when the closest distance between the geofence and the geographical location detected by the GPS module is greater than a second preset threshold. The second preset threshold may be the same as or different from the first preset threshold.

It should be understood that a determined service may be different when the mobile phone 100 enters the geofence and moves out of the geofence. For example, when entering the geofence, the mobile phone 100 may determine a service related to the geofence, for example, recommending a point of interest (such as a shop or an attraction) inside the geofence. When moving out of the geofence, the mobile phone 100 may determine another service, for example, a service of recommending a point of interest outside the geofence, or another service related to moving out of the geofence.

For example, before S711, if the mobile phone 100 is in a screen-locked and screen-off state, the application processor 110-1 may light up the display 194 after determining a service based on the event of entering the geofence, and the display 194 displays related information of the service.

Figure 9A:
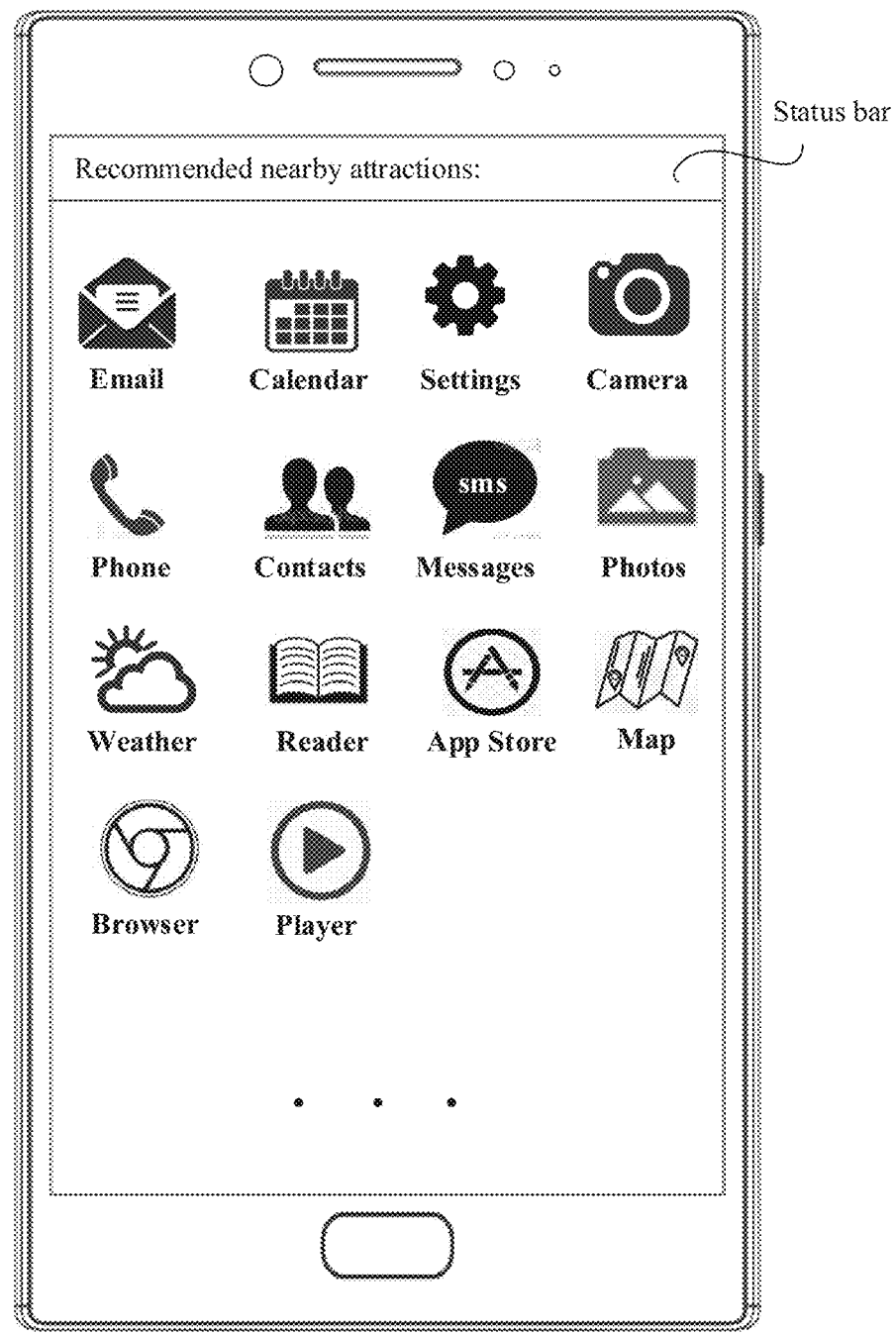
FIG. 9(a) and FIG. 9(b) are a schematic diagram of graphical user interfaces of a mobile phone 100 according to an embodiment of this application.
Figure 9B:
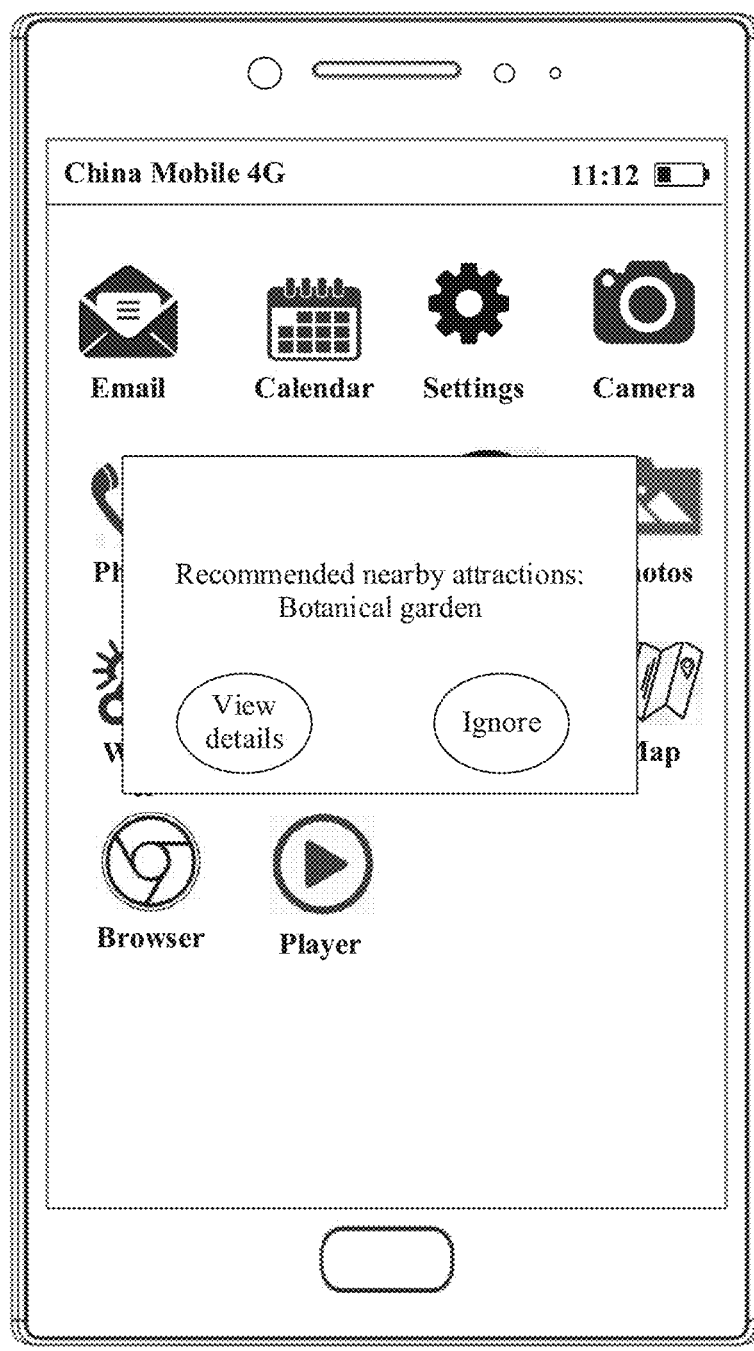
Figure 10:
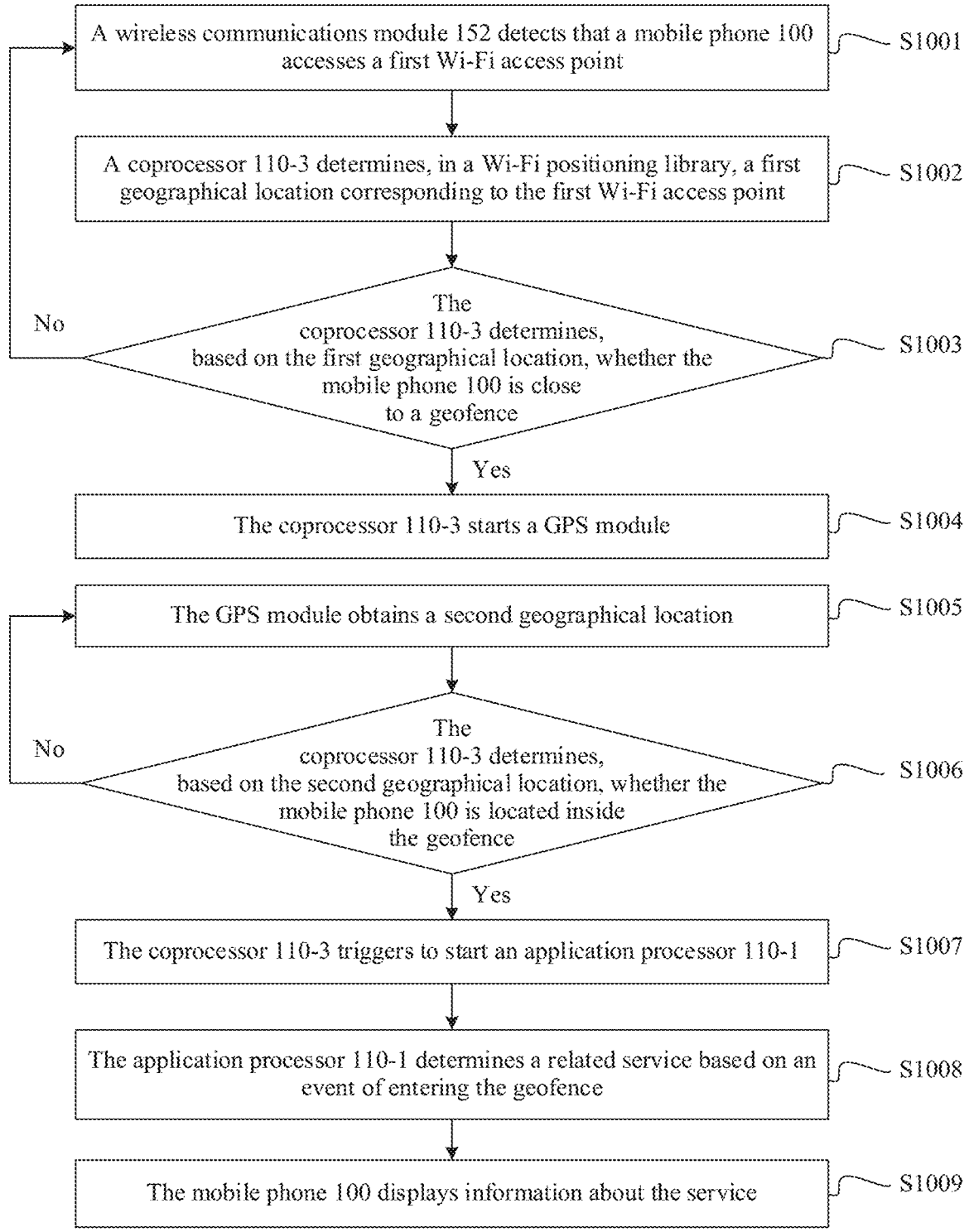
FIG. 10 is a schematic flowchart of a method for determining that a terminal device is located inside a geofence according to an embodiment of this application.

In another example, before S711, if the mobile phone 100 is in a screen-on and unlocked state, the mobile phone 100 may display related service information on a status bar, as shown in FIG. 9(*a*). Alternatively, the mobile phone 100 may also pop up a prompt box, and the prompt box displays service information, as shown in FIG. 9(*b*).

In the embodiment shown in FIG. 7A and FIG. 7B, the coprocessor 110-3 determines the cell information by using the modem processor 110-2, and determines, based on the cell information and the cell positioning library, whether the mobile phone 100 is relatively close to the geofence. If the mobile phone 100 is relatively close to the geofence, the coprocessor 110-3 starts the GPS module. It is avoided that the GPS module is started to perform remote meaningless positioning while the mobile phone 100 is relatively far away from the geofence. This helps reduce power consumption.

Example 2

Manner 2 (Wi-Fi positioning library) and manner 3 (GPS positioning) are combined.

S1001: The wireless communications module 152 detects that the mobile phone 100 accesses a first Wi-Fi access point.

S1002: The coprocessor 110-3 determines, in the Wi-Fi positioning library, a first geographical location corresponding to the first Wi-Fi access point.

S1003: The coprocessor 110-3 determines, based on the first geographical location, whether the mobile phone 100 is close to a geofence. If yes, S1004 is performed; or if no, S1001 is performed.

For example, when determining that the first geographical location is outside the geofence, and a closest distance between the first geographical location and the geofence is less than or equal to a first preset threshold, the coprocessor 110-3 determines that the mobile phone 100 is close to the geofence.

S1004: The coprocessor 110-3 starts a GPS module.

S1005: The GPS module obtains a second geographical location.

S1006: The coprocessor 110-3 determines, based on the second geographical location, whether the mobile phone 100 is located inside the geofence. If yes, S1007 is performed; or if no, S1005 is performed.

S1007: The coprocessor 110-1 triggers to start the application processor 110-1.

S1008: The application processor 110-1 determines a related service based on an event of entering the geofence.

S1009: The mobile phone 100 displays service information.

It should be understood that the cell positioning library and the Wi-Fi positioning library used in Example 1 and Example 2 may be located in a same positioning library. The positioning library includes not only a correspondence between a cell identifier and a geographical location, but also a correspondence between a Wi-Fi identifier and the geographical location. The mobile phone 100 may traverse the positioning library, and obtains first communication access information (for example, cell information or Wi-Fi information) of the mobile phone 100 and a corresponding first geographical location. Certainly, the cell positioning library and the Wi-Fi positioning library may alternatively be located in different positioning libraries. The mobile phone 100 may select a proper positioning library based on a first communications access point. For example, when the first communications access point is Wi-Fi, the Wi-Fi positioning library is selected, or when the first communications access point is a cell, the cell positioning library is selected. Certainly, the cell positioning library or the Wi-Fi positioning library may alternatively be a positioning library in another form. This is not limited in this embodiment of this application.

Example 3

Manner 1 (cell positioning library) and manner 2 (Wi-Fi offline positioning library) are combined.

For example, the mobile phone 100 may first detect a geographical location by using a Wi-Fi access point positioning library (referring to the foregoing manner 3). If the detection fails, for example, a Wi-Fi access point cannot be detected, or a detected Wi-Fi access point does not exist in the positioning library, the mobile phone 100 may detect the geographical location by using the cell positioning library (referring to the foregoing manner 2).

Generally, coverage of the Wi-Fi access point is less than coverage of a cell. Therefore, precision of the Wi-Fi access point positioning library is relatively high, and universality of the cell is relatively good, for example, there may be no Wi-Fi access point in coverage of some cells. Therefore, the mobile phone 100 may preferably use the Wi-Fi access point positioning library, and when the Wi-Fi access point positioning library cannot implement positioning, the cell positioning library is used, so as to ensure that positioning can be implemented.

In some embodiments of this application, the mobile phone 100 may select, based on geographical location precision required by an application, a manner to be used. Different applications require different precision, and some applications require relatively high geographical location precision. For such applications, the third manner or a combination of another manner and the third manner may be used. Some applications require relatively low geographical location precision. For such applications, manner 1 and/or manner 2 may be used.

For example, the mobile phone 100 currently has only one application that enables a positioning function, and the application requires relatively high precision. In this case, the mobile phone 100 may use the third manner. Alternatively, the mobile phone 100 has a plurality of applications that enable the positioning function, but a currently running application that enables the positioning function requires relatively low precision. In this case, the mobile phone 100 may use any one of manner 1, manner 2, or a combination thereof.

In the foregoing embodiment, the Wi-Fi positioning library is a correspondence between the Wi-Fi access point accessed by the mobile phone 100 and the geographical location. The following describes another Wi-Fi positioning library. The Wi-Fi positioning library includes a correspondence between a Wi-Fi identifiers set and a geographical location.

Example 4

Figures 11, 12:
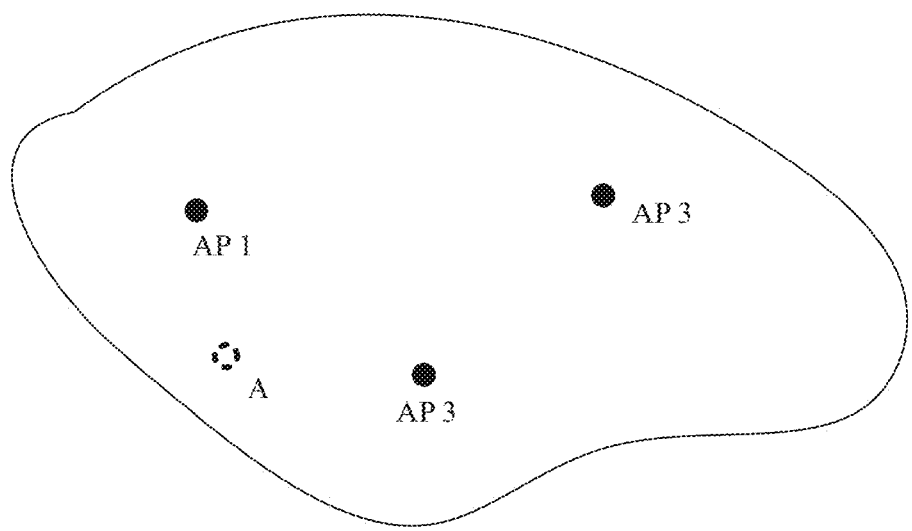
FIG. 11 is a schematic diagram of another Wi-Fi access point positioning library according to an embodiment of this application.
FIG. 12 is a schematic diagram of a wireless access point inside a geofence according to an embodiment of this application.

Referring to FIG. 11, the Wi-Fi positioning library includes the correspondence between the Wi-Fi identifiers set and the geographical location. A Wi-Fi access point set is a set including all Wi-Fi access points in the geofence. For example, referring to FIG. 12, the geofence includes an AP 1 (bssid 1), an AP 2 (bssid 2), and an AP 3 (bssid 3). Correspondingly, in FIG. 11, (bssid 1, bssid 2, bssid 3) corresponds to (vlon$_1$, vlat$_1$).

For example, still referring to FIG. 12, it is assumed that when the mobile phone 100 is at a location A, a second set including found Wi-Fi identifiers of APs is (bssid 1, bssid 2), in other words, a Wi-Fi identifier of the AP 3 is not found. If the mobile phone 100 determines, in the Wi-Fi access point positioning library shown in FIG. 11, that an intersection set of the second set and a first set (bssid 1, bssid 2, bssid 3) is not empty, it is determined that the mobile phone 100 enters a first geofence corresponding to the first set.

That the intersection set is not empty includes that two intersection sets are equal, or two intersection sets are not equal but the intersection sets are not empty.

In some other embodiments, when a quantity of same Wi-Fi identifiers in the first set and the second set is greater than a preset quantity, it is determined that the mobile phone 100 enters the first geofence corresponding to the first set. The preset quantity may be half of a total quantity of APs in the geofence.

For example, still referring to FIG. 12, it is assumed that when the mobile phone 100 is at the location A, the second set including found Wi-Fi identifiers of APs is (bssid 1), in other words, Wi-Fi identifiers of the AP 2 and the AP 3 are not found. The second set (bssid 1) and the first set (bssid 1, bssid 2, and bssid 3) have only one same Wi-Fi identifier, that is, bssid 1, which is less than 1.5 (the total quantity of APs in the geofence is 3, so the preset quantity is 1.5), it is determined that the mobile phone 100 does not enter the first geofence corresponding to the first set.

Figure 13A:
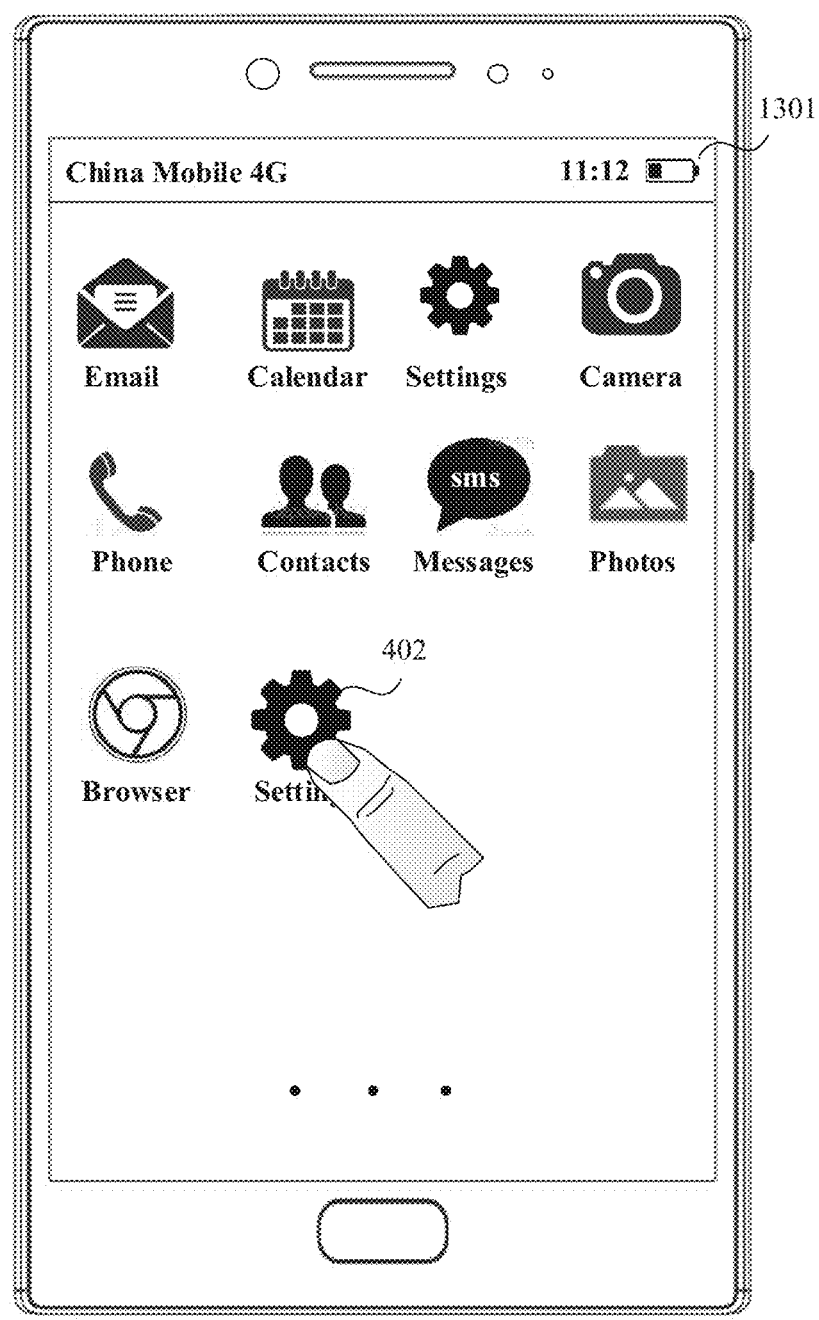
FIG. 13(a), FIG. 13(b), and FIG. 13(c) are a schematic diagram of graphical user interfaces of a mobile phone 100 according to an embodiment of this application.
Figure 13B:
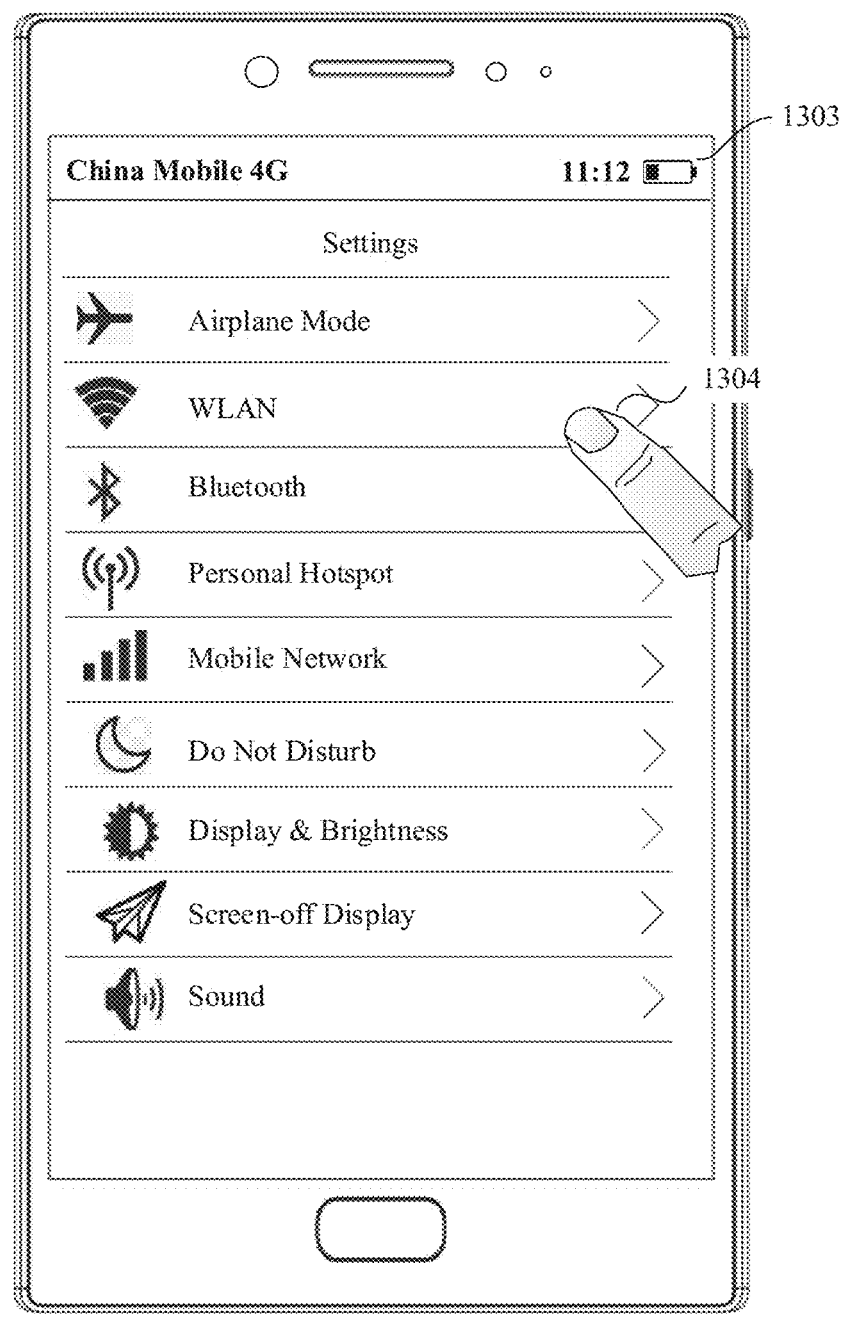
Figure 13C:
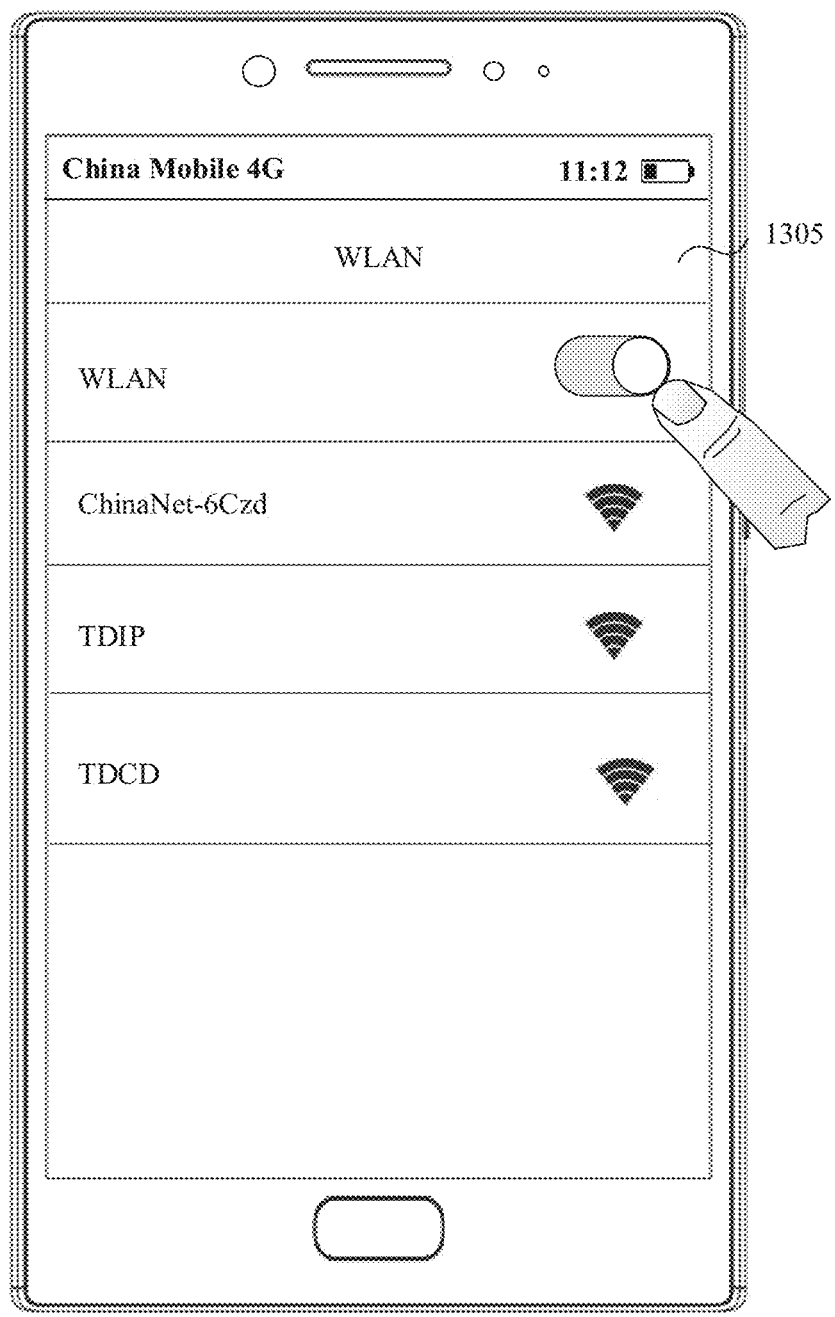

A mobile phone is used as an example. In a geographical location, the mobile phone may search for a Wi-Fi identifier of an AP near the location. For example, FIG. 13(*a*), FIG. 13(*b*), and FIG. 13(*c*) are a schematic diagram of a display interface of a Wi-Fi identifier searched by a mobile phone according to an embodiment of this application. In FIG. 13(*a*), the mobile phone displays a home screen 1301, and the home screen 1301 includes an icon 1302 of a settings application. When detecting an operation of triggering the icon 1302 by a user, the mobile phone displays an interface 1303 shown in FIG. 13(*b*). As shown in FIG. 13(*b*), the interface 1303 includes an option 1304 of a wireless local area network. When detecting an operation of triggering the option 1304 by the user, the mobile phone displays an interface 1305 shown in FIG. 13(*c*). As shown in FIG. 13(*c*), the interface 1305 includes three Wi-Fi names, that is, Wi-Fi identifiers of three APs found by the mobile phone at a geographical location. Therefore, the Wi-Fi identifiers of the three APs found by the mobile phone may be used as a second set.

The mobile phone 100 may perform positioning by using the Wi-Fi access point positioning library shown in FIG. 11 or the Wi-Fi positioning library shown in FIG. 4.

For example, when the mobile phone 100 does not currently access a Wi-Fi, the mobile phone 100 may determine a geographical location based on found Wi-Fi and the Wi-Fi access point positioning library shown in FIG. 11.

For another example, when the mobile phone 100 currently accesses a Wi-Fi, the mobile phone 100 may determine the geographical location based on the Wi-Fi and the Wi-Fi positioning library shown in FIG. 4.

For another example, when the mobile phone 100 currently accesses a Wi-Fi, and the geographical location cannot be determined based on the Wi-Fi and the Wi-Fi positioning library shown in FIG. 4 (for example, each Wi-Fi in the Wi-Fi positioning library shown in FIG. 4), the geographical location can be determined based on the found Wi-Fi and the Wi-Fi access point positioning library shown in FIG. 11.

Example 5

Figure 14:
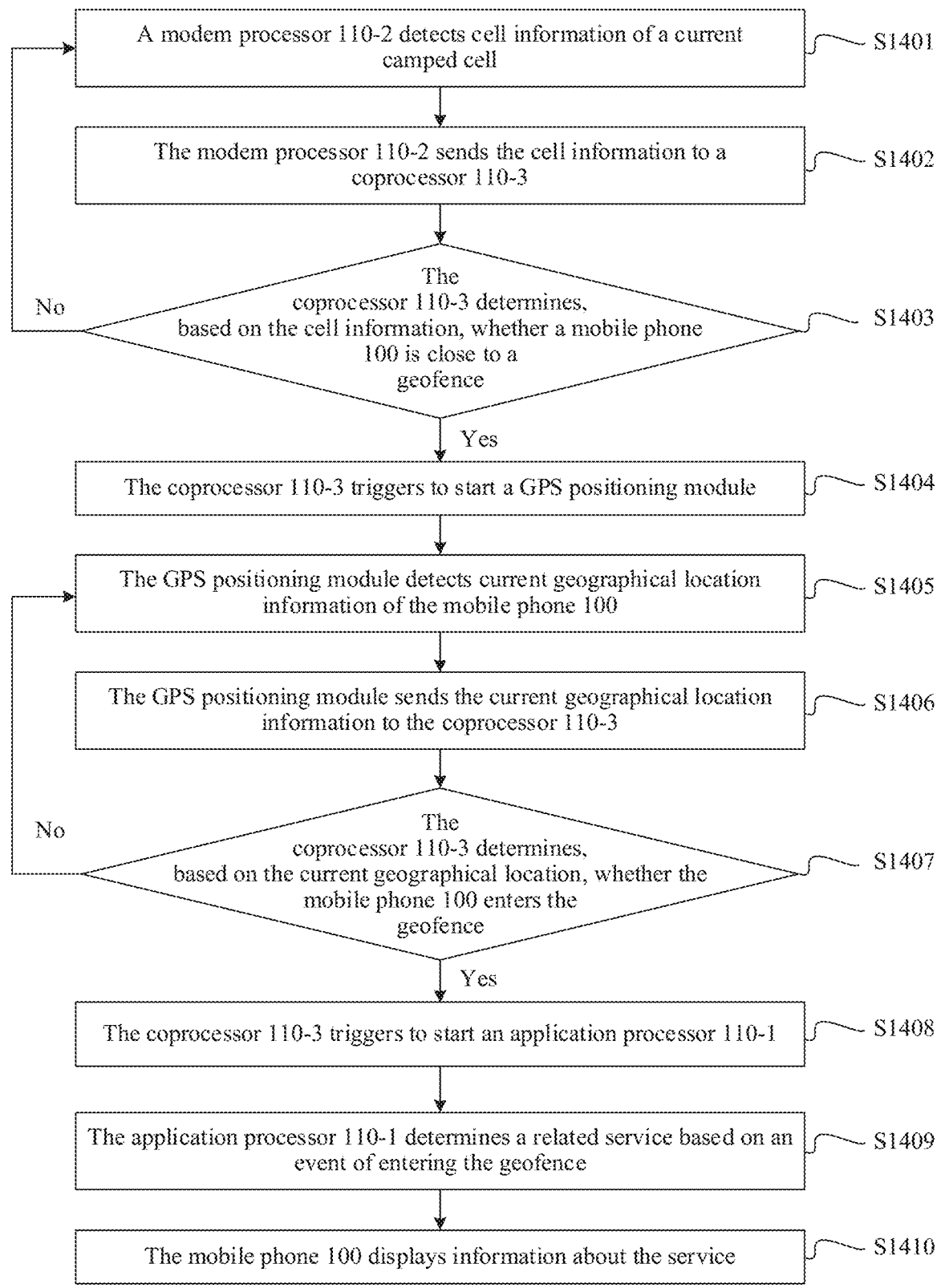
FIG. 14 is a schematic flowchart of a method for determining that a terminal device is located inside a geofence according to an embodiment of this application.

FIG. 14 is a schematic flowchart of a method for determining that a terminal device is located inside a geofence according to an embodiment of this application. As shown in FIG. 14, a procedure of the method includes the following steps.

S1401: The modem processor 110-2 detects cell information of a current camped cell.

S1402: The modem processor 110-2 sends the cell information to the coprocessor 110-3.

S1403: The coprocessor 110-3 determines, based on the cell information, whether the mobile phone 100 is close to the geofence. If yes, S1404 is performed; or if no, S1401 is performed.

Specifically, a process in which the coprocessor 110-3 determines whether the mobile phone 100 is close to the geofence may include:

The coprocessor 110-3 determines, based on the cell information, whether the cell is in stored preset cells, and if yes, the coprocessor 110-3 determines that the mobile phone 100 is close to the geofence. The preset cell is a cell located between the geofence and a preset boundary.

Figure 15:
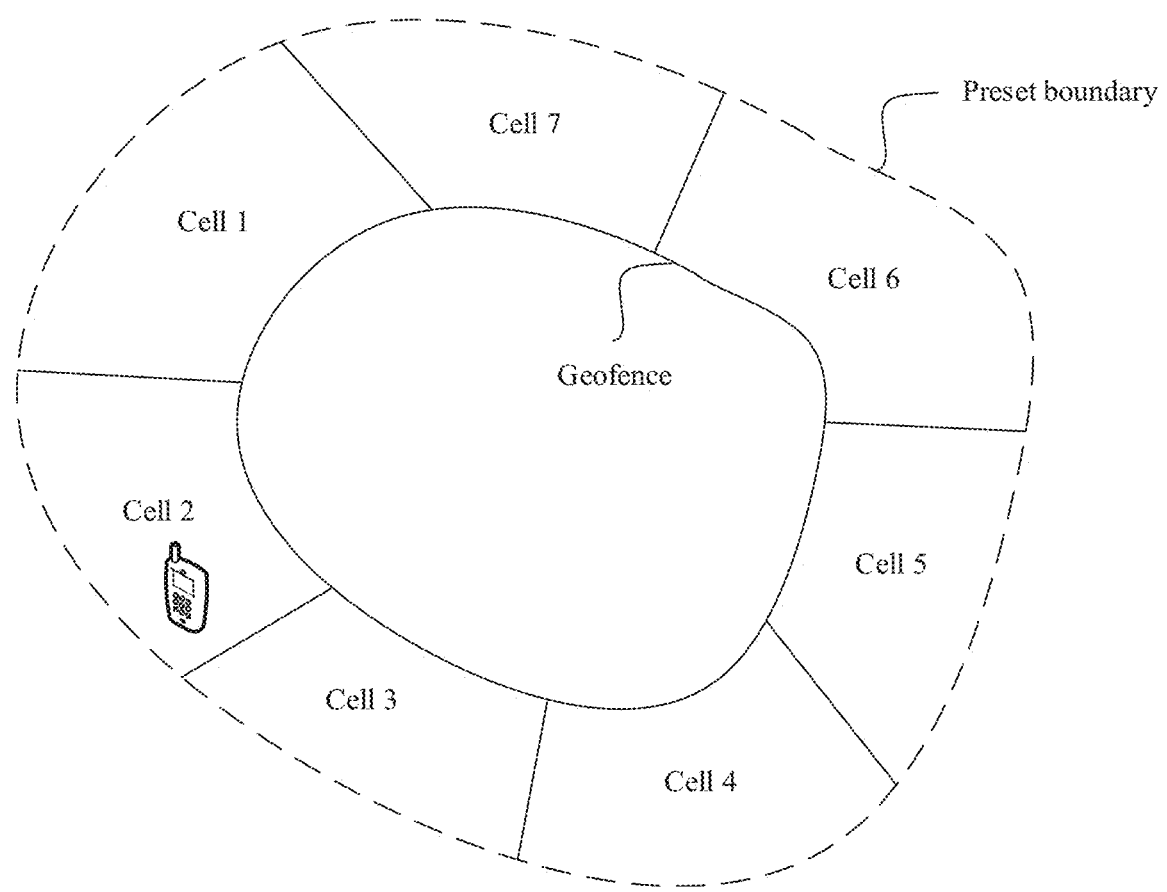
FIG. 15 is a schematic diagram of preset cells outside a geofence according to an embodiment of this application.

Referring to FIG. 15, a preset boundary (a dashed line in FIG. 15) exists at a preset distance outside a geofence (a solid line in FIG. 15), and cells within a range from the preset boundary to the geofence are preset cells. That is, the cells in an area between the solid line and the dashed line in FIG. 12 are the preset cells. In FIG. 15, an example in which the preset cells include seven cells is used. When the modem processor 110-2 in the mobile phone 100 detects that a current camped cell is a cell in the preset cell, the mobile phone 100 enters the preset boundary, that is, the mobile phone 100 is close to the geofence. For example, in FIG. 15, if the mobile phone 100 detects a cell 2 of the current camped cell, the mobile phone 100 is close to the geofence.

It should be understood that a distance between the preset boundary and the geofence may be preset, and the preset cell may be checked and stored in the mobile phone 100 before delivery of the mobile phone 100. Certainly, the preset cell may alternatively be downloaded by a user from a server in a process of using the mobile phone 100. This is not limited in this embodiment of this application.

The following describes a process in which the mobile phone 100 obtains the preset cell.

The mobile phone 100 determines a geofence (represented by a GF), and determines a preset boundary (represented by a CF) at a preset distance outside the geofence. In this case, coverage of the CF is greater than coverage of the GF, and a range of CF-GF is a range between the preset boundary and the geofence. After collecting cell information of a plurality of cells, the mobile phone 100 filters the cells based on the CF-GF range. For example, the mobile phone 100 classifies collected cells as CF 1, CF 2, CF 3, . . . , CF n, calculates an overlap ratio Sk of a range covered by CF k to a range covered by the CF-GF, and if Sk is greater than or equal to a threshold, retains the cell as a preset cell, or otherwise, discards the cell. A group of cells CF 1, CF 2, CF 3, . . . , CF m (m is less than or equal to n) are obtained through filtering. The group of cells are the preset cells corresponding to the geofence.

S1404: The coprocessor 110-3 starts a GPS module.

S1405: The GPS module detects current geographical location information of the mobile phone 100.

S1406: The GPS module sends the current geographical location information to the coprocessor 110-3.

Generally, geographical location information detected by the GPS module is a longitude and latitude. The GPS module sends the detected longitude and latitude information to the coprocessor 110-3.

S1407: The coprocessor 110-3 determines, based on the current geographical location, whether the mobile phone 100 enters a geofence range. If yes, S1408 is performed; or if no, S1405 is performed.

S1408: The coprocessor 110-3 starts the application processor 110-1.

The coprocessor determines, based on the longitude and latitude information detected by the GPS module and the geofence, for example, the geofence shown in FIG. 2, whether the mobile phone 100 enters the geofence. For example, when the detected longitude and latitude information is in the geofence shown in FIG. 2, it is determined that the mobile phone 100 enters the geofence; or otherwise, it is determined that the mobile phone 100 does not enter the geofence.

S1409: The application processor 110-1 determines a related service based on an event of entering the geofence.

It should be noted that different applications determine different services based on the event of entering the geofence. Taking a Ctrip application as an example, a related service determined by the Ctrip application based on the event of entering the geofence includes recommending a point of interest, such as food information and attraction information, in the geofence to the user.

S1410: The mobile phone 100 displays related information about the service.

In the embodiment shown in FIG. 14, the coprocessor 110-3 determines the cell information by using the modem processor 110-2, and starts the GPS module when determining, based on the cell information, that the mobile phone 100 is close to the geofence. It is avoided that the GPS module is started to perform remote meaningless positioning while the mobile phone 100 is relatively far away from the geofence. This helps reduce power consumption.

In this embodiment of this application, when determining that the mobile phone 100 enters the geofence, the coprocessor 110-3 may immediately wake up the application processor 110-1, or may delay a preset time to wake up the application processor 110-1. For example, the coprocessor 110-1 may determine, based on a precision requirement of an application, whether to immediately wake up the application processor or delay waking up the application processor. The precision requirement of the application may be a quantity of services that can be recommended by the application within a preset distance. For example, if a first application determines information about all merchants within a range of 500 meters each time, and a second application determines information about an attraction within a range of 20 kilometers each time, a precision requirement of the first application is higher than a precision requirement of the second application. This is because a time required for the mobile phone 100 to move out of a range of 500 meters is relatively short, and if the application processor 110-1 is not immediately triggered to wake up, services within the range of 500 meters cannot be recommended to the user in time. However, a time required for the mobile phone 100 to move out of a range of 20 kilometers is relatively long, and the coprocessor 100 may slightly delay waking up the application processor, and services within the range of 20 kilometers can also be recommended to the user.

For example, the mobile phone 100 has only one application that enables a positioning function, and the application requires relatively low precision. Therefore, the coprocessor 110-1 may delay a period of time to wake up the application processor 110-1.

For another example, the mobile phone 100 has a plurality of applications that enable the positioning function, and a currently running application requires relatively high precision. Therefore, the coprocessor 110-3 may immediately wake up the application.

For another example, the mobile phone 100 has a plurality of applications that enable the positioning function. Some applications require relatively high precision, and some applications require relatively low precision. The coprocessor 110-3 may immediately wake up the application processor 110-1. The application processor 110-1 may immediately run the application that requires relatively high precision and slightly delay running the application that requires relatively low precision.

A software architecture of the mobile phone 100 is described below.

Figure 16:
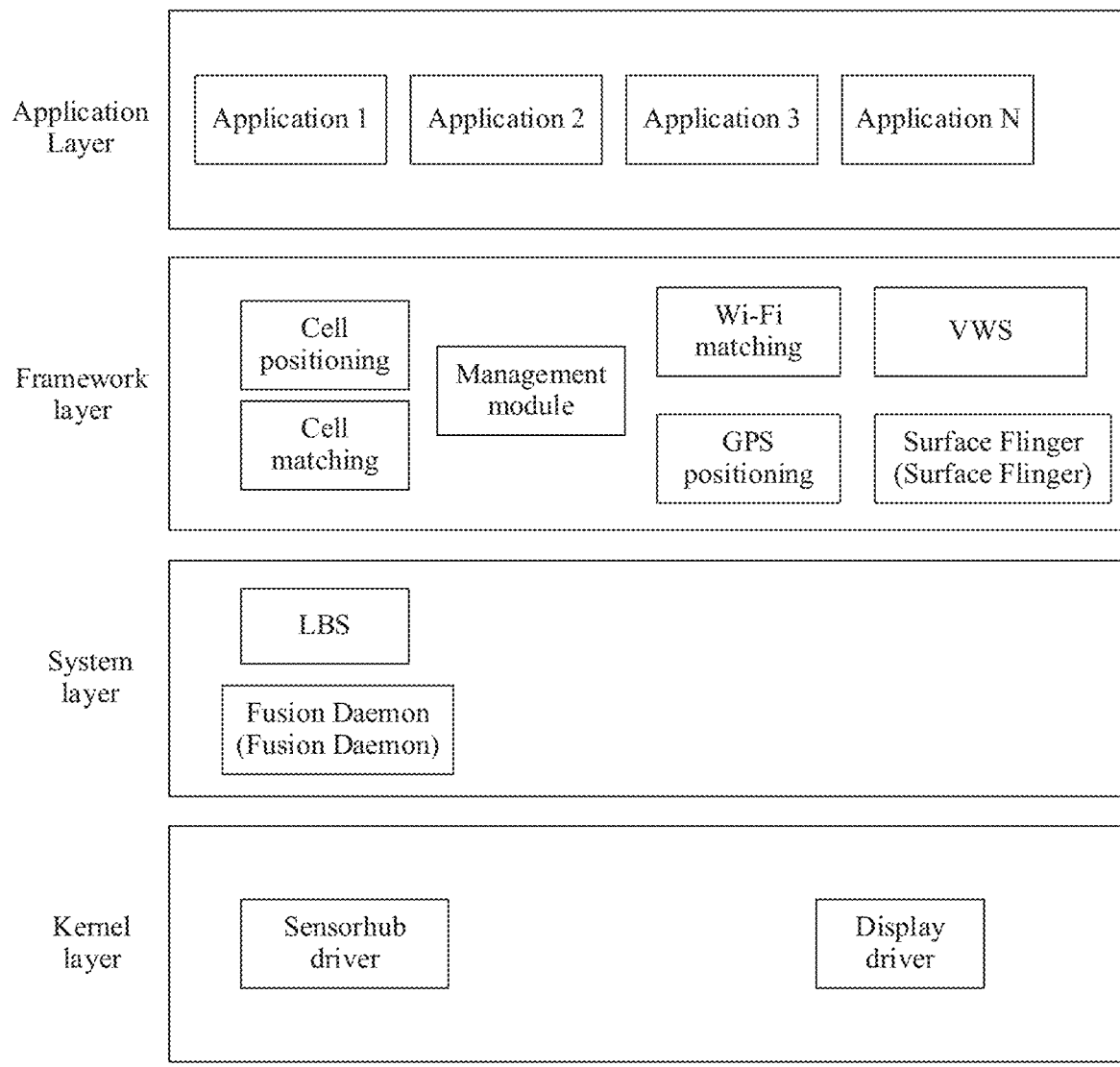
FIG. 16 is a schematic diagram of a software architecture of a mobile phone 100 according to an embodiment of this application.

FIG. 16 is a diagram of a software architecture according to an embodiment of this application. The software architecture shown in FIG. 16 uses the mobile phone 100 as an example, and an Android architecture is used as an example. It should be understood that FIG. 5 or FIG. 6 shows a hardware architecture of the mobile phone 100, and FIG. 16 shows the software architecture of the mobile phone 100. Therefore, a software module and/or code of the software architecture shown in FIG. 16 may be stored in the internal memory 121. When the processor 110 runs the software module or the code, the processor 110 performs the method for determining that the terminal device is located inside the geofence provided in the embodiments of this application.

As shown in FIG. 16, the software architecture sequentially includes a kernel layer, a system layer, a framework layer, and an application layer from bottom to top. The following describes functions of each layer.

The kernel layer includes a sensorhub (sensorhub) driver, and may be configured to obtain a Wi-Fi identifier, cell information, GPS information, and the like. This is because, from a perspective of hardware, a sensorhub may be connected to the wireless communications module 152, the modem processor 110-2, and the GPS positioning module 191. For example, after detecting the Wi-Fi identifier, the wireless communications module 152 sends the Wi-Fi identifier to the sensorbuh, and the sensorbuh driver reports the Wi-Fi identifier to the system layer. Similarly, after detecting the cell information, the modem processor 110-2 sends the cell information to the sensorbuh, and the sensorbuh driver reports the cell information to the system layer. Similarly, after detecting the GPS information, the GPS positioning module 191 sends the GPS information to the sensorbuh, and the sensorbuh driver reports the GPS information to the system layer.

The kernel layer further includes a display driver, configured to drive the display 194 to display information.

The system layer includes Fusion Daemon, configured to report, through a location based service (location based service, LBS) channel, information reported by the kernel layer to an upper layer, namely, the framework layer.

The framework layer includes a cell matching module and a cell positioning module. The cell matching module is configured to match cell information reported by a bottom layer with stored cell information. For example, the cell information is a cell ID. The cell matching module may determine whether a reported cell ID exists in cell IDs of a plurality of stored preset cells (example 5). The cell positioning module is configured to perform positioning based on the cell information reported by the bottom layer and a cell positioning library (example 1).

A management module is configured to: when it is determined that a condition is met (for example, the mobile phone 100 is close to the geofence), trigger to start a GPS matching module. The GPS matching module is configured to determine, based on the reported GPS information, whether the mobile phone 100 enters the geofence.

A Wi-Fi matching module is configured to implement positioning based on the reported Wi-Fi identifier and a Wi-Fi access point positioning library.

The application layer includes various applications, such as an application 1, an application 2, and an application 3. A positioning function is enabled for some applications, for example, the application 2. When detecting that the mobile phone 100 enters the geofence, the framework layer may send an event of entering the geofence to the application 2, and the application 2 may provide a corresponding service.

Several examples in which the coprocessor 110-3 determines whether the mobile phone 100 enters the geofence are described below by using the software architecture shown in FIG. 16 and the hardware architecture shown in FIG. 6.

Example 1

The coprocessor 110-3 runs the software module or code stored in the internal memory 121 to perform the following process:

After obtaining cell information of a current camped cell, the sensorhub driver at the kernel layer may report the cell information to the Fusion Daemon at the system layer. The Fusion Daemon is configured to report, through the LBS channel, the cell information reported by the kernel layer to the cell positioning module at the framework layer. The cell positioning module may match, in the cell positioning library, a geographical location corresponding to the cell information. Content about the cell positioning library is described above, and details are not described herein again.

After determining that the mobile phone 100 enters the geofence, the coprocessor triggers to start the application processor, and the application processor runs the software module or code in the internal memory 121 to execute the following process:

The cell positioning module reports, through the management module, the event of entering the geofence to the application 2 at the application layer, and the application 2 generates a corresponding service based on the geofence event, and delivers related information of the service to a window manager service (window manager service, WMS). The WMS sends the related information of the service to the display driver through Surflinger, so as to drive the display 194 to display the related information of the service.

It should be understood that, in the software architecture shown in FIG. 16, some software modules may be run by the coprocessor 110-3, and some software modules may be run by the application processor 110-1 to implement different effects.

Example 2

The coprocessor 110-3 runs the software module or code stored in the internal memory 121 to perform the following process:

After obtaining the Wi-Fi identifier of an AP, the sensorhub driver at the kernel layer may report the Wi-Fi identifier to the Fusion Daemon at the system layer, so that information reported by the kernel layer is reported to the Wi-Fi matching module at the framework layer through the LBS channel. The Wi-Fi matching module may perform positioning based on the reported Wi-Fi identifier and the Wi-Fi access point positioning library (the positioning library shown in FIG. 4 or FIG. 11). This part of content has been described above, and details are not described herein again.

After determining that the mobile phone 100 enters the geofence, the coprocessor triggers to start the application processor, and the application processor runs the software module or code in the internal memory 121 to execute the following process:

The Wi-Fi matching module reports, through the management module, the event of entering the geofence to the application 2 at the application layer, and the application 2 generates a corresponding service based on the geofence event and delivers the service to the WMS. The WMS sends related information of the service to the display driver through the Surflinger, so as to drive the display 194 to display the related information of the service.

Example 3

The coprocessor 110-3 runs the software module or code stored in the internal memory 121 to perform the following process:

After obtaining the GPS information, that is, a longitude and latitude, the sensorhub driver at the kernel layer may report the longitude and latitude and precision to the Fusion Daemon at the system layer, so that information reported by the kernel layer is reported to the GPS matching module at the framework layer through the LBS channel. The GPS matching module may determine, based on the longitude and latitude, whether to enter the geofence. This part of content has been described above, and details are not described herein again.

After determining that the mobile phone 100 enters the geofence, the coprocessor triggers to start the application processor 110-1, and the application processor 110-1 runs the software module or code in the internal memory 121 to execute the following process:

The GPS matching module reports, through the management module, the event of entering the geofence to the application 2 at the application layer, and the application 2 generates a corresponding service based on the geofence event and delivers the service to the WMS. The WMS sends related information of the service to the display driver through the Surflinger, so as to drive the display 194 to display the related information of the service.

Example 4

The coprocessor 110-3 runs the software module or code stored in the internal memory 121 to perform the following process:

After obtaining cell information of a current camped cell, the sensorhub driver at the kernel layer may report the cell information to the Fusion Daemon at the system layer. The Fusion Daemon is configured to report, through the LBS channel, the cell information reported by the kernel layer to the cell matching module at the framework layer. The cell matching module may search, in the stored preset cells outside the cell geofence, whether the current camped cell exists. This part of content has been described above, and details are not described herein again.

After determining that the mobile phone 100 enters the geofence, the coprocessor triggers to start the application processor, and the application processor runs the software module or code in the internal memory 121 to execute the following process:

The cell matching module reports, through the management module, the event of entering the geofence to the application 2 at the application layer, and the application 2 generates a corresponding service based on the geofence event, and delivers related information of the service to a window manager service (window manager service, WMS). The WMS sends the related information of the service to the display driver through Surflinger, so as to drive the display 194 to display the related information of the service.

It should be noted that, because the GPS module can detect precision, the kernel layer may report the precision to the upper layer. For example, assuming that both the application 1 and the application 2 enable a positioning service, when determining that precision reported by the bottom layer does not meet a precision requirement of the application 1, the GPS matching module may not send the event of entering the geofence to the application 1. For example, if the precision of the application 1 is less than 200 m, but the precision reported by the bottom layer is 1 km, the precision requirement of the application 1 is not met.

The implementations of this application may be randomly combined to achieve different technical effects.

In the foregoing embodiments provided in this application, the method provided in the embodiments of this application is described from a perspective in which the terminal device (the mobile phone 100) is used as an execution body. To implement functions in the method provided in the embodiments of this application, the terminal device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

An embodiment of this application further provides a computer storage medium. The computer storage medium stores computer instructions. When the computer instructions are run on an electronic device, the electronic device is enabled to perform one or more steps in the embodiment shown in FIG. 7A and FIG. 7B, FIG. 10, or FIG. 14, to implement the graphics rendering method in the foregoing embodiments.

This embodiment further provides a program product. When the program product runs on a computer, the computer is enabled to perform one or more steps in the embodiment shown in FIG. 7A and FIG. 7B, FIG. 10, or FIG. 14, to implement the graphics rendering method in the foregoing embodiments.

In addition, an embodiment of this application further provides an apparatus. The apparatus may be specifically a chip, a component, or a module, and the apparatus may include a processor and a memory that are connected to each other. The memory is configured to store computer-executable instructions. When the apparatus runs, the processor may execute the computer-executable instructions stored in the memory, so that the chip performs one or more steps in the embodiment shown in FIG. 5 or FIG. 9(a) and FIG. 9(b), to implement the graphics rendering method in the foregoing embodiments.

The electronic device, the computer storage medium, the program product, or the chip provided in the embodiments is configured to perform the corresponding method provided above. Therefore, for beneficial effects that can be achieved, refer to the beneficial effects in the corresponding method provided above. Details are not described herein again.

It should be understood that in the specification, claims, and the accompanying drawings of the present invention, the terms "first", "second", and the like are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those expressly listed steps or modules, but may include other steps or modules not expressly listed or inherent to such a process, method, system, product, or device.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention. It is clearly that persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, comprising:
reporting, by a terminal device, location reference information to a server, wherein the location reference information indicates an area range in which the terminal device is currently located;
receiving, by the terminal device and in response to reporting the location reference information, a positioning library from the server, wherein the positioning library corresponds to the area range, and wherein the positioning library comprises communication access information and corresponding geographical information;
storing, by the terminal device, the positioning library;
obtaining, by the terminal device and based on the positioning library, a first geographical location corresponding to the communication access information;
starting, by the terminal device, a positioning module to obtain a second geographical location of the terminal device when a location relationship between the first geographical location and a geofence meets a first preset condition; and
identifying, by the terminal device and based on the second geographical location, that the terminal device is located inside the geofence.

2. The method of claim 1, wherein the first preset condition comprises that a distance between the first geographical location and the geofence is less than or equal to a first preset threshold.

3. The method of claim 2, wherein the first preset condition further comprises that the first geographical location is outside the geofence.

4. The method of claim 1, wherein the communication access information comprises cell access information.

5. The method of claim 1, wherein the communication access information comprises WI-FI access information.

6. The method of claim 1, wherein the positioning module comprises a Global Positioning System (GPS) module.

7. The method of claim 1, further comprising:
starting the positioning module to obtain the second geographical location based on a trigger periodicity; and
setting the trigger periodicity based on a distance between the second geographical location and the geofence and a moving speed of the terminal device when the terminal device is in a motion state.

8. The method of claim 1, further comprising:
starting the positioning module to obtain the second geographical location of the terminal device based on a trigger periodicity; and
increasing the trigger periodicity when the terminal device is in a static state.

9. The method of claim 1, further comprising obtaining, based on the positioning library, the first geographical location corresponding to second communication access information of the terminal device when the first geographical location corresponding to first communication access information of the terminal device fails to be obtained based on the positioning library.

10. The method of claim 9, wherein the first communication access information is cell access information, and wherein the second communication access information is WI-FI access information.

11. The method of claim 1, further comprising disabling the positioning module when a distance between the second geographical location and the geofence is greater than a second preset threshold.

12. The method of claim 1, further comprising outputting first information of a first service, wherein the first service is related to an event of entering the geofence.

13. The method of claim 1, further comprising outputting second information of a second service when the second geographical location indicates that the terminal device moves out of the geofence, wherein the second service is related to an event of moving out of the geofence.

14. The method of claim 1, further comprising:
establishing communication with another terminal device; and
sending the positioning library to the other terminal device when the other terminal device meets a condition.

15. The method of claim 14, further comprising:
detecting that a distance between the other terminal device and the terminal device is less than a preset distance; or
receiving, from the other terminal device, an instruction that requests the positioning library.

16. A method, comprising:
receiving, by a server, communication access information and a first geographical location that are from at least one terminal device;
constructing, by the server, a positioning library, wherein the positioning library comprises a correspondence between the communication access information and a second geographical location, wherein the second geographical location is based on the first geographical location, and wherein the positioning library corresponds to an area range to which the at least one terminal device is currently located;
receiving, by the server, location reference information from the at least one terminal device, wherein the location reference information indicates the area range; and
delivering, by the server and in response to receiving the location reference information, the positioning library to the at least one terminal device.

17. A device, comprising:
a memory configured to store instructions; and
one or more processors coupled to the memory and configured to execute the instructions to cause the device to be configured to:
report location reference information to a server, wherein the location reference information indicates an area range in which the device is currently located;
receive, in response to reporting the location reference information, a positioning library from the server, wherein the positioning library corresponds to the area range, and wherein the positioning library comprises communication access information and corresponding geographical information;
store the positioning library;
obtain, based on the positioning library, a first geographical location corresponding to the communication access information;
start a positioning module to obtain a second geographical location of the device when a location relationship between the first geographical location and a geofence meets a first preset condition; and
identify, based on the second geographical location, that the device is located inside the geofence.

18. The device of claim 17, wherein the first preset condition comprises that a distance between the first geographical location and the geofence is less than or equal to a first preset threshold.

19. The method of claim 1, wherein the communication access information comprises a plurality of cell identifiers, and wherein the corresponding geographical information comprises longitude and latitude coordinates corresponding to each of the cell identifiers.

20. The method of claim 1, wherein the communication access information comprises a plurality of WI-FI identifiers, and wherein the corresponding geographical information comprises longitude and latitude coordinates corresponding to each of the WI-FI identifiers.

* * * * *